(12) United States Patent
Rajvanshi et al.

(10) Patent No.: US 10,373,327 B2
(45) Date of Patent: Aug. 6, 2019

(54) REASSEMBLING AND REPAIRING TORN IMAGE PIECES

(71) Applicant: Adobe Inc., San Jose, CA (US)

(72) Inventors: Tushar Rajvanshi, Meerut (IN); Sourabh Gupta, Noida (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 76 days.

(21) Appl. No.: 15/786,909

(22) Filed: Oct. 18, 2017

(65) Prior Publication Data

US 2019/0114795 A1 Apr. 18, 2019

(51) Int. Cl.
*G06T 7/00* (2017.01)
*G06T 7/55* (2017.01)
*G06T 11/60* (2006.01)
*G06T 11/20* (2006.01)

(52) U.S. Cl.
CPC .......... *G06T 7/55* (2017.01); *G06T 7/97* (2017.01); *G06T 11/60* (2013.01); *G06T 11/20* (2013.01)

(58) Field of Classification Search
CPC ... G06T 7/55; G06T 7/97; G06T 11/60; G06T 11/20
See application file for complete search history.

(56) References Cited

U.S. PATENT DOCUMENTS

| | | | | |
|---|---|---|---|---|
| 2014/0321734 A1* | 10/2014 | Shirley | ........... | G01B 11/14 382/154 |
| 2018/0124276 A1 | 5/2018 | Sawa | | |
| 2018/0144458 A1* | 5/2018 | Xu | ........... | G06K 9/4676 |

FOREIGN PATENT DOCUMENTS

| | | |
|---|---|---|
| CN | 104680519 | 6/2015 |
| JP | 2007316949 | 12/2007 |

OTHER PUBLICATIONS

"Combined Search and Examination Report", GB Application No. 1814708.2, dated Mar. 11, 2019, 8 pages.
Makridis, "An Innovative Algorithm for Solving Jigsaw Puzzles Using Geometrical and Color Features", Nov. 2005, pp. 966-976.
Yao, "A shape and image merging technique to solve jigsaw puzzles", Dec. 2002, pp. 1819-1835.

\* cited by examiner

*Primary Examiner* — Ping Y Hsieh
(74) *Attorney, Agent, or Firm* — SBMC

(57) ABSTRACT

A digital medium environment includes at least one computing device. Systems and techniques are described herein for reassembling and repairing image sections (e.g., torn pieces of an image) by generating masks for the image sections that do not include content of the image sections, and matching image sections along contours (e.g., edges or sides of the image sections) based on shapes of the masks, features of content extracted from the image sections, or combinations thereof, depending on whether an ambiguity is determined. An ambiguity is determined when not all image sections included in the scans are matched by shape, or are redundantly matched. A composite image is reassembled from the image sections based on matching image sections. Furthermore, a composite image is repaired by adding material to the composite image from an additional image (e.g., an image other than the composite image and the image sections).

20 Claims, 11 Drawing Sheets

REASSEMBLING AND REPAIRING TORN IMAGE PIECES

BACKGROUND

Printed images such as photographs, documents, artwork, maps, and the like often have no backup copy, such as a digital copy of a document (e.g., a signed contract) stored on a computer disk, or original negative of a photograph now lost over time. Consequently printed images often representative single points of failure of information included in the printed images. If the printed image is lost or destroyed, the information in the printed image is also lost or destroyed.

Often a printed image is torn into multiple pieces by inadvertent circumstance, such as when a toddler finds a family photo album and tears vintage photographs to pieces. Without a backup copy of the image, the torn pieces must be reassembled and repaired to recover the information in the image. Reassembly and repair of the image pieces is usually done by manual methods that require significant time and effort, even from a trained professional. Consequently, the cost can be prohibitively high when securing the services of trained professionals, such as photo labs, to reassemble and repair torn image pieces, accompanied by a long wait for a reconstructed image (e.g., days or weeks). Moreover, because the process is manual, the results are not repeatable, so that one photo lab may provide significantly better finished products than another photo lab, based on the skill level, determination, and mood of the trained professionals at the time they are doing the reassembly and repair.

Furthermore, trained professionals may be limited to the torn images pieces they are provided for repair purposes, such as relying on material from one of the torn image pieces when filling in a hole of a torn image piece. Depending on the missing information (e.g., information lost in the hole), such repair methods that are limited to using the torn image pieces for fill material may not provide acceptable compensation.

Moreover, for a neophyte user to image restoration, the process of reassembling and repairing torn image pieces may be daunting, for example taking days of work on modern image processing applications available to computing devices, such as Adobe's Photoshop®. Even after considerable effort, the neophyte user is not guaranteed acceptable results.

SUMMARY

Techniques and systems are described to automatically and without user intervention reassemble and repair torn image pieces from one or more printed images (e.g., photographs, documents, receipts, and the like). At least one scan is obtained that includes image sections, such as torn pieces of a photograph. The image sections are identified from the scans and a respective mask for each image section is generated. The mask describes the shape (e.g., contour) of the image section without describing the content of the image section, and is used to match image sections based on their shapes. If all the image sections are not uniquely matched by their shapes (e.g., one image section remains unmatched, or one image section is matched along an edge to multiple image sections), than an ambiguity is declared, and features of content of the image sections are used to match the image sections and resolve the ambiguity. The image sections are reassembled based on the matched image sections to form a composite image, and compensation is performed by adding material (e.g., to fill a hole in the composite image) obtained from one of the image sections or an image other than the image sections, such as an image from a user library of images or image gallery (e.g., a shared photo web site). Furthermore, multiple images can be simultaneously processed by obtaining scans of torn image sections from the multiple images. The image sections are automatically separated and assigned to one of the multiple images, and multiple composite images, one for each of the multiple images, are generated from the image sections of the multiple images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
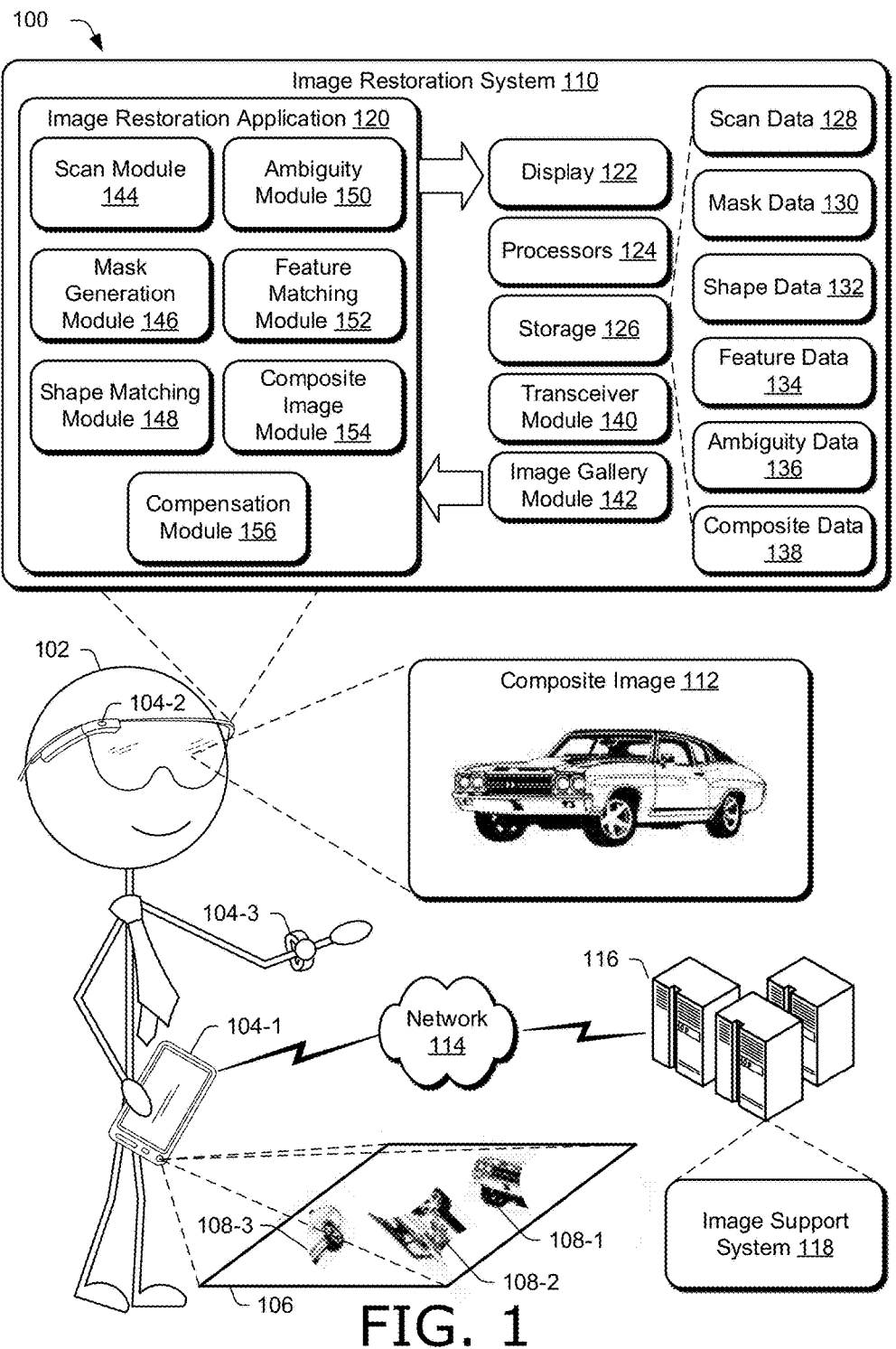
FIG. 1 illustrates a digital medium environment in an example implementation that is operable to employ techniques described herein.

When an image (e.g., a printed image) such as a photograph, document, receipt, artwork, map, and the like, is torn into multiple image sections (e.g., pieces of the image), traditional methods of reassembling and repairing the image sections includes manual processes that are slow and costly, and require an advanced skill set (e.g., a trained professional). Accordingly, results are not repeatable, and an acceptable result is not guaranteed. These problems are exacerbated for a novice user who is not trained in image reassembly and repair methods, so that the novice user is likely to produce a sub-standard reconstructed image, despite considerable effort expended.

Moreover, when the image sections are provided to a trained professional (e.g., a photo lab), often the photo lab is limited to working with the provided image sections, and does not have access to other images that may be useful to repair the image sections, such as a user's library or image gallery. Therefore, repair work when limited to using material from the image sections may be suboptimal.

Accordingly, this disclosure describes systems and techniques for automatically and without user intervention reassembling and repairing image sections (e.g., torn image pieces) from a printed image (e.g., photographs, documents, receipts, papers, book pages, magazine articles, and the like) to form a composite image. The image sections are obtained in one or more scans (e.g., from a scanning device such as a scanner, imager, camera, copier, and the like) and can be in any order relative to one another, and at any rotation relative to the scan or other image sections. The image sections are identified in the scans, such as using a graph cut technique that separates the image sections in a foreground of the scan from a background of the scan. A mask for each image section is generated that describes the shape (e.g., contour) of the image section without describing the content of the image section. An example of a mask for an image section is a pixel-by-pixel bit map that includes a binary indicator for each pixel of a scan indicating whether the pixel is included in the image section. Image sections are matched based on their shapes described in respective masks. In one example, image sections are matched based on the shapes by computing shape matching scores between respective masks determined from hue moments of edges, or sides, of a mask.

If all the image sections are not uniquely matched by their shapes (e.g., one image section remains unmatched, or one image section is redundantly matched along an edge to multiple image sections), than an ambiguity is declared. When an ambiguity is declared, features of content of the image sections are extracted with a rotationally-invariant feature descriptor. The extracted features are used to resolve the ambiguity, e.g., find a match for an unmatched image section or remove redundant matches (e.g., false matches that were determined based on the shape of the mask without accounting for the features of content in the image sections), or both. The matching image sections found by matching shapes and by matching features of content may be grouped into pairs of matching image sections.

The matching image sections are reassembled (e.g., integrated) to form a composite image. Because edges of image sections may be frayed, image sections may have holes, and the like, so that material may be absent from the composite image. Not only can absent material be filled from one of the image sections, but the absent material can also be filled from another, different image, such as an image obtained from a user library or gallery of images, an image obtained from an on-line social media post, an image sent or attached in an email, and the like. Furthermore, any suitable image compensation to blend the image sections is performed, so that the resulting compensated composite image cannot be distinguished from an original, non-destroyed image (e.g., the image before it was torn into image pieces).

Moreover, the systems and techniques described herein automatically and without user intervention separate image sections according to which image of a plurality of images the image sections belong. Multiple images can be simultaneously processed by obtaining scans of image sections from the multiple images. The image sections are separated and assigned to one of the multiple images. Multiple composite images, one representing each of the multiple images, are generated from the image sections based on the shapes described in masks and features extracted from the image sections, as described in more detail below.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one computing device (e.g., a mobile device). In the example in FIG. 1, user 102 is illustrated as having three computing devices, computing devices 104-1, 104-2, and 104-3 (collectively 104). For instance, computing device 104-1 depicts a tablet, computing device 104-2 depicts a pair of eye glasses (e.g., smart goggles), and computing device 104-3 depicts a smart watch. Computing devices 104 are example computing devices, and any suitable computing device is contemplated, such as a mobile phone, tablet, laptop computer, desktop computer, gaming device, goggles, glasses, camera, personal digital assistant, non-linear editor, digital audio workstation, copier, scanner, and the like. Furthermore, discussion of one of computing devices 104 is not limited to that computing device, but generally applies to each of the computing devices 104. Moreover, computing devices 104 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 104. For example, computing devices 104 can recognize input as being a mouse input, stylus input, touch input, input provided through a natural user interface, and the like. Thus, computing devices 104 can recognize multiple types of gestures including touch gestures and gestures provided through a natural user interface.

Figure 11:
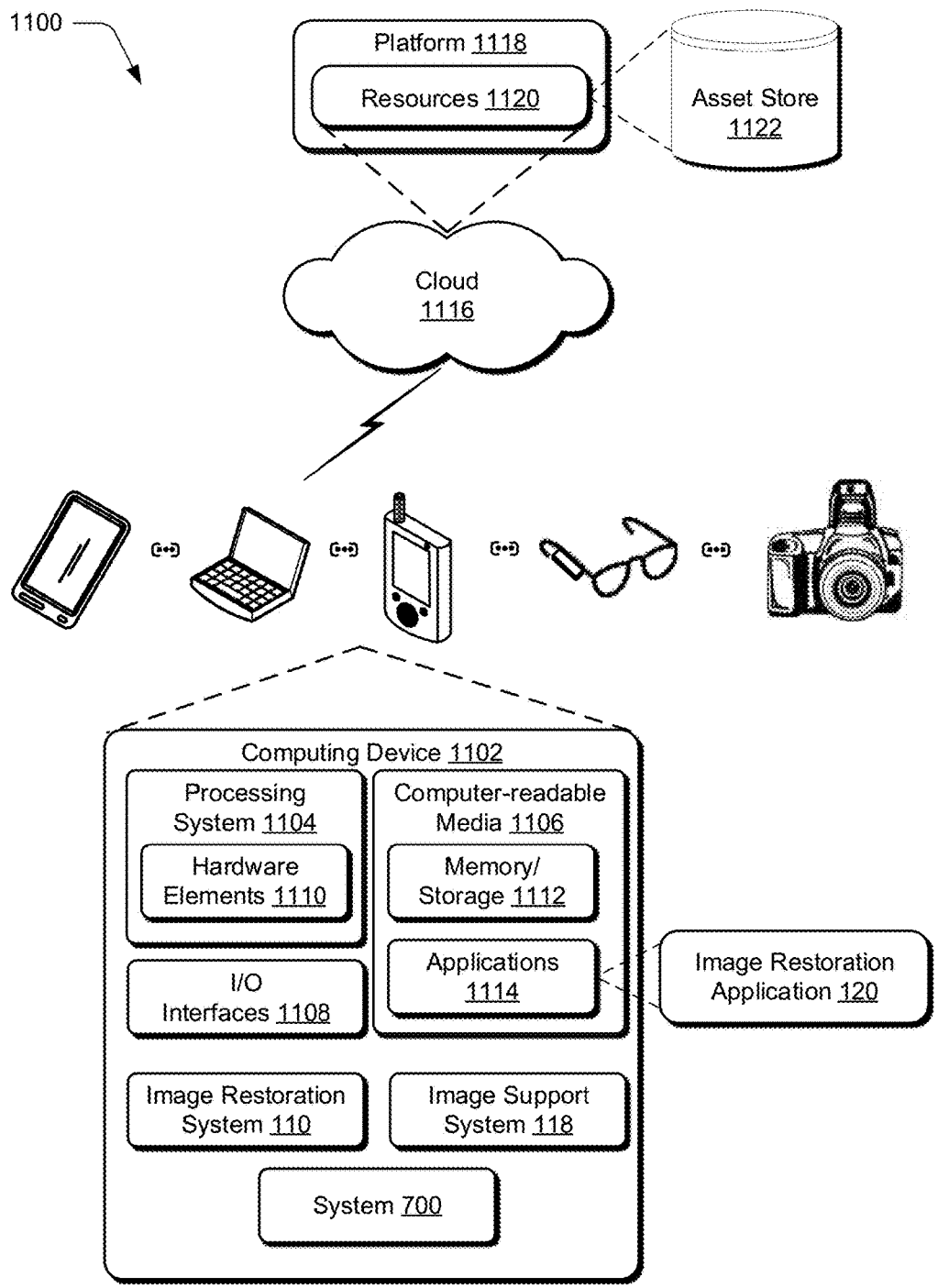
FIG. 11 illustrates an example system including various components of an example device that can be implemented as any type of computing device as described and/or utilized with reference to FIGS. 1-10 to implement aspects of the techniques described herein.

Furthermore, computing devices 104 may be representative of one or a plurality of different devices, such as one or more devices connected to a network that perform operations "over the cloud" as further described in relation to FIG. 11. In one example, computing devices 104 are communicatively coupled to each other, such as with a low power wireless communication standard (e.g., a Bluetooth® protocol). For instance, computing device 104-1 can communicate wirelessly with computing device 104-2 and computing device 104-3. Hence, an image generated or stored on one device (e.g., computing device 104-1) can be communicated to, and displayed on another device (e.g., computing device 104-2).

In the example illustrated in FIG. 1, computing device 104-1 scans a surface 106 (e.g., a desktop, an input surface of a copier or scanner, and the like) displaying image section 108-1, image section 108-2, and image section 108-3 (collectively 108). Scanning can be done in any suitable way, such as by taking a picture, copying with a scanner or imaging device, generating a negative or inverse image, and the like. Image sections 108 depict torn pieces of an image (e.g., a printed image of a car). Using image restoration system 110 (discussed in more detail below), computing device 104-1 reassembles and repairs image sections 108 to form composite image 112, which is displayed on computing device 104-2. Additionally or alternatively, composite image 112 can be displayed on a display screen of computing device 104-1.

Computing devices 104 are also coupled to network 114. Network 114 communicatively couples computing devices 104 with server 116 (for clarity, only computing device 104-1 is illustrated in FIG. 1 as coupled to network 114, though computing devices 104-2 and 104-3 can also be coupled to server 116 via network 114). Network 114 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 116 may include one or more servers or service providers that provide services and/or resources to computing devices 104. Generally, resources provided by server 116 may be licensed, purchased, or may be made freely available, (e.g., without authentication, license, or account-based access). The resources can include any suitable combination of services and content, such as made available over network 114 by one or more providers. Some examples of services include, but are not limited to, an online shopping service, a photo editing service, a web development and management service, a collaboration service, a social networking service, a messaging service, an advertisement service, a graphics design service, an image storage service (including storage of photos, documents, records, files, and the like), and so forth. Content may include various combinations of assets, including videos, ads, audio, multi-media streams, animations, images, web documents, web pages, applications, device applications, text documents, drawings, presentations, stock photographs, user profiles, user preferences, user data (e.g., images stored in an image gallery), and the like.

Server 116 includes image support system 118 configurable to receive signals from computing devices 104, process the received signals, and send the processed signals to computing devices 104 to support reassembly and repair of images (e.g., torn image sections). For instance, computing device 104-1 may scan image sections 108, and communicate the image sections 108 to server 116. Using image support system 118, server 116 can generate composite image 112 from the image sections 108 received by computing device 104-1, and send composite image 112 back to computing device 104-1 to be displayed on computing device 104-1 or any suitable computing device. Accordingly, image support system 118 of server 116 can include a copy of image restoration system 110.

Computing devices 104 include image restoration system 110 to reassemble and repair image sections, such as image sections 108. For clarity, computing device 104-2 is illustrated in FIG. 1 as including image restoration system 110, though computing device 104-1 and computing device 104-3 also include copies of image restoration system 110 (not shown).

Image restoration system 110 includes a display 122 for displaying images, such as image sections 108, composite image 112, and the like. Display 122 can be any suitable type of display, such as a touchscreen, liquid crystal display, plasma display, and the like. Image restoration system 110 also includes processors 124. Hence, image restoration system 110 may be implemented at least partially by executing instructions stored on storage 126 on processors 124. For instance, processors 124 may execute portions of image restoration application 120.

Storage 126 can be any suitable type of storage accessible by or contained in image restoration system 110. Storage 126 stores and provides access to and from memory included in storage 126 for any suitable type of data. For instance, storage 126 includes scan data 128 (e.g., data including scans of image sections, extracted images sections, etc.), mask data 130 (e.g., data representing masks of image sections), shape data 132 (e.g., data representing contours of edges of masks of image sections, including hue moments and shape matching scores), feature data 134 (e.g., data representing features of content extracted from image sections), ambiguity data 136 (e.g., data indicating whether image sections are uniquely matched based on shape data 132, including a determination of ambiguity), and composite data 138 (e.g., data representing composite images, such as composite image 112, compensation data, compensated composite images, and assignment indicators assigning image sections to one of a plurality of images).

Furthermore, image restoration system 110 includes transceiver module 140. Transceiver module 140 is representative of functionality configured to transmit and receive data using any suitable type and number of communication protocols. For instance, data within image restoration system 110 may be transmitted to server 116 with transceiver module 140. Furthermore, data can be received from server 116 with transceiver module 140. Transceiver module 140 can also transmit and receive data between computing devices 104.

Image restoration system 110 also includes image gallery module 142. Image gallery module 142 is representative of functionality configured to obtain data (e.g., images) that can be used to repair image sections 108. Hence, image gallery module 142 may use transceiver module 140 to obtain any suitable data from any suitable source, including obtaining images from a user's directory of files on computing devices 104 or server 116, obtaining images from a user's photo gallery (e.g., an online photo sharing service, images stored in a user's image editing application, such as Photoshop®), images a user has posted in a social media post, blog, online comment, and the like, images a user has attached to an email, text, or other communication sent from or received by computing devices 104, images provided by a search service, such as an online search for similar images to composite image 112, images obtained from a database of stock images, images provided by user 102, such as an image that user 102 may have that is similar to composite image 112, and the like. Hence, image gallery module 142 obtains images other than image sections 108 and composite image 112 that can be used to repair composite image 112, such as by adding material absent in composite image 112 from an image obtained by image gallery module 142 to composite image 112.

Image restoration system 110 also includes image restoration application 120. Image restoration application 120 includes scan module 144, mask generation module 146, shape matching module 148, ambiguity module 150, feature matching module 152, composite image module 154, and compensation module 156. These modules work in conjunction with each other to reassemble and repair image sections 108 and display composite image 112 to user 102.

Scan module 144 is representative of functionality configured to obtain at least one scan including a plurality of image sections, such as image sections 108, and identify the image sections in the scans. A scan can be any suitable type of scan, such as a scan produced by a scanner or copier, a scan produced from a camera (e.g., a photograph), and the like. Furthermore, scan module 144 can obtain any suitable number of scans. In one example, a plurality of image sections of an image are spread across multiple scans, and scan module 144 obtains each of the multiple scans to obtain all the image sections. Additionally or alternatively, image sections for an image can be included in a single scan obtained by scan module 144.

Furthermore, the image sections can be in any order within a scan. For instance, the image sections can be arranged in the scan in a random order. Furthermore, the image sections can be placed in any orientation (e.g., alignment within the scan) relative to the scan or other image sections. Accordingly, no preconceived arrangement of the image pieces is needed when positioning the image sections within a scan or obtaining a scan.

In one example, user 102 scans image sections 108 using an imaging component of computing device 104-1 (e.g., a camera or copier), and scan module 144 obtains the scan generated by computing device 104-1. Additionally or alternatively, scan module 144 can obtain a scan from scan data 128 that was generated on a device other than computing devices 104, such as a scan generated at a commercial copying service (e.g., a brick and mortar copy center) that is transferred to scan data 128 by user 102.

Moreover, a scan obtained by scan module 144 can include image sections from any suitable number of images. In one example, a scan obtained by scan module 144 includes image sections from multiple images, and image restoration system 110 performs a separation task by assigning each image section to one of the multiple images. For instance, the multiple image sections may represent different types of images, such as a photograph, a title to a vehicle, and a bill to be paid. A scan obtained by scan module 144 can include image sections from the photograph, the vehicle title, and the unpaid bill in any order and any orientation. Additionally or alternatively, a scan obtained by scan module 144 can include image sections from a single image.

Figure 2:
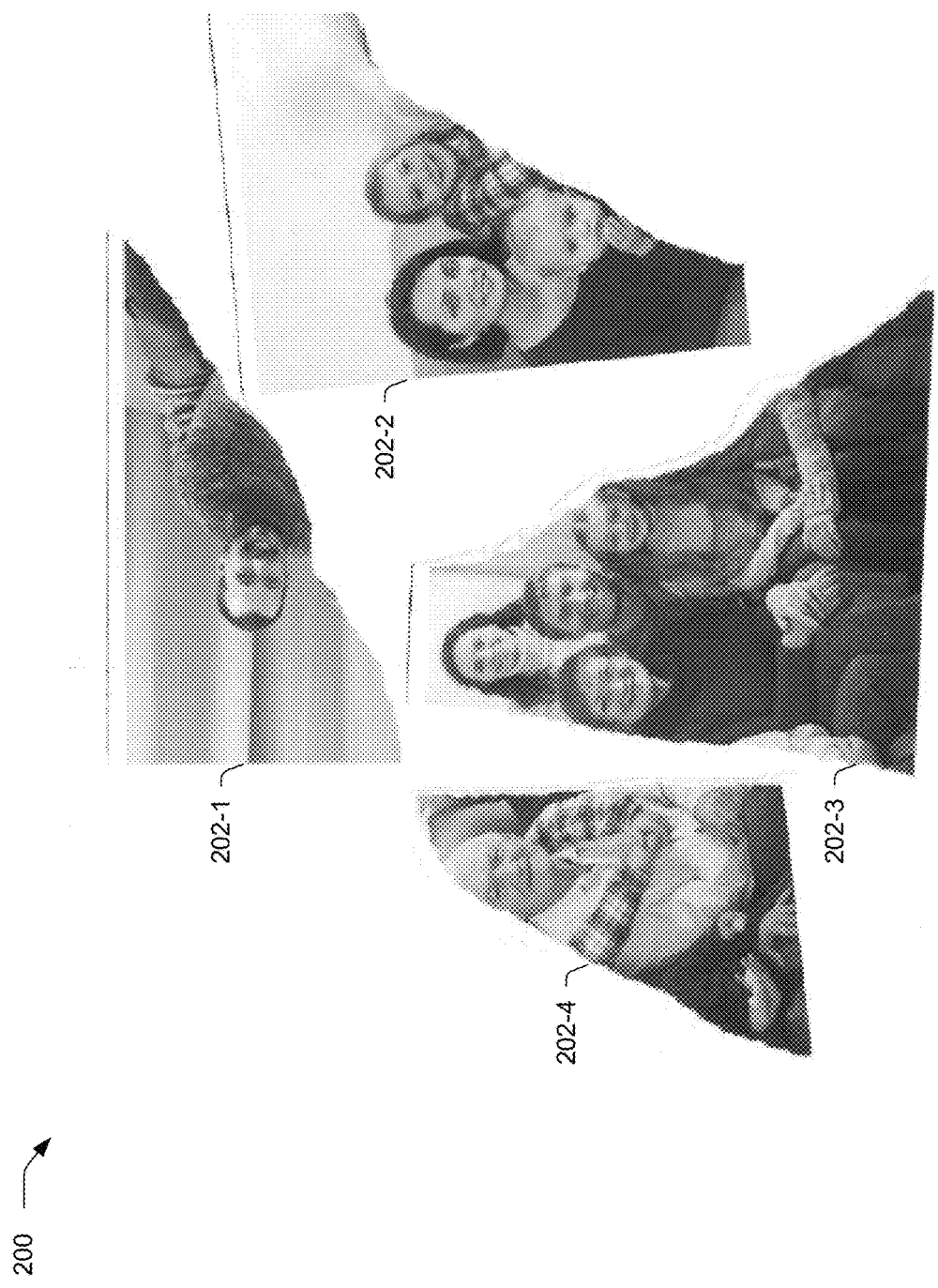
FIG. 2 illustrates an example scan of example image sections in accordance with one or more aspects of the disclosure.

As an example, consider FIG. 2 which illustrates an example scan 200 of example image sections 202-1, 202-2, 202-3, and 202-4 (collectively 202) in accordance with one or more aspects of the disclosure. In the example scan 200, image sections 202 are torn image sections of a single, printed photograph (e.g., a family portrait taken with a film camera). Information in the photograph can be irreplaceable if the negative of the photograph is lost (which is often the case for vintage photographs), or in the case of a digital camera, if the file is corrupted or lost. In such cases, image sections 202 must be reassembled and repaired to restore the information in the photograph. In the example in FIG. 2, four image sections of a single image are included in a scan. In general, a scan can include any suitable number of image sections of any suitable number of images.

Returning to FIG. 1, scan module 144 obtains any suitable number of scans of any suitable number and type of images, such as scan 200 in FIG. 2, and identifies image sections in the scans. In one example, scan module 144 separates image sections in a foreground of the scan from a background of the scan using graph cut techniques. Since a background of a scan is usually homogeneous in nature (e.g., a texture of surface 106), segmentation of the image sections in the foreground from the background with graph cut techniques accurately identifies the image sections in the scan. The image sections identified by scan module 144 can be denoted in any suitable way, such as in a table, enumerated list, bitmap of the scan, and the like. Scans obtained by scan module 144, including information regarding identified image sections, are stored in scan data 128 of storage 126. Identified image sections are provided to mask generation module 146. This can include extracting the image sections from the scan and providing the extracted image sections to mask generation module 146, providing a scan obtained by scan module 144 and identifiers of the image sections in the scan to mask generation module 146 (which may in turn extract image sections from the scan), or combinations thereof.

Mask generation module 146 is representative of functionality configured to generate a respective mask for each image section. A mask for an image section describes the shape of an image section, without describing the content of the image section. In one example, a mask for an image section includes binary indicators for pixels of a scan indicating whether the pixels are included in the image section. Masks generated by mask generation module 146 are stored in mask data 130 in storage 126.

Figure 3:
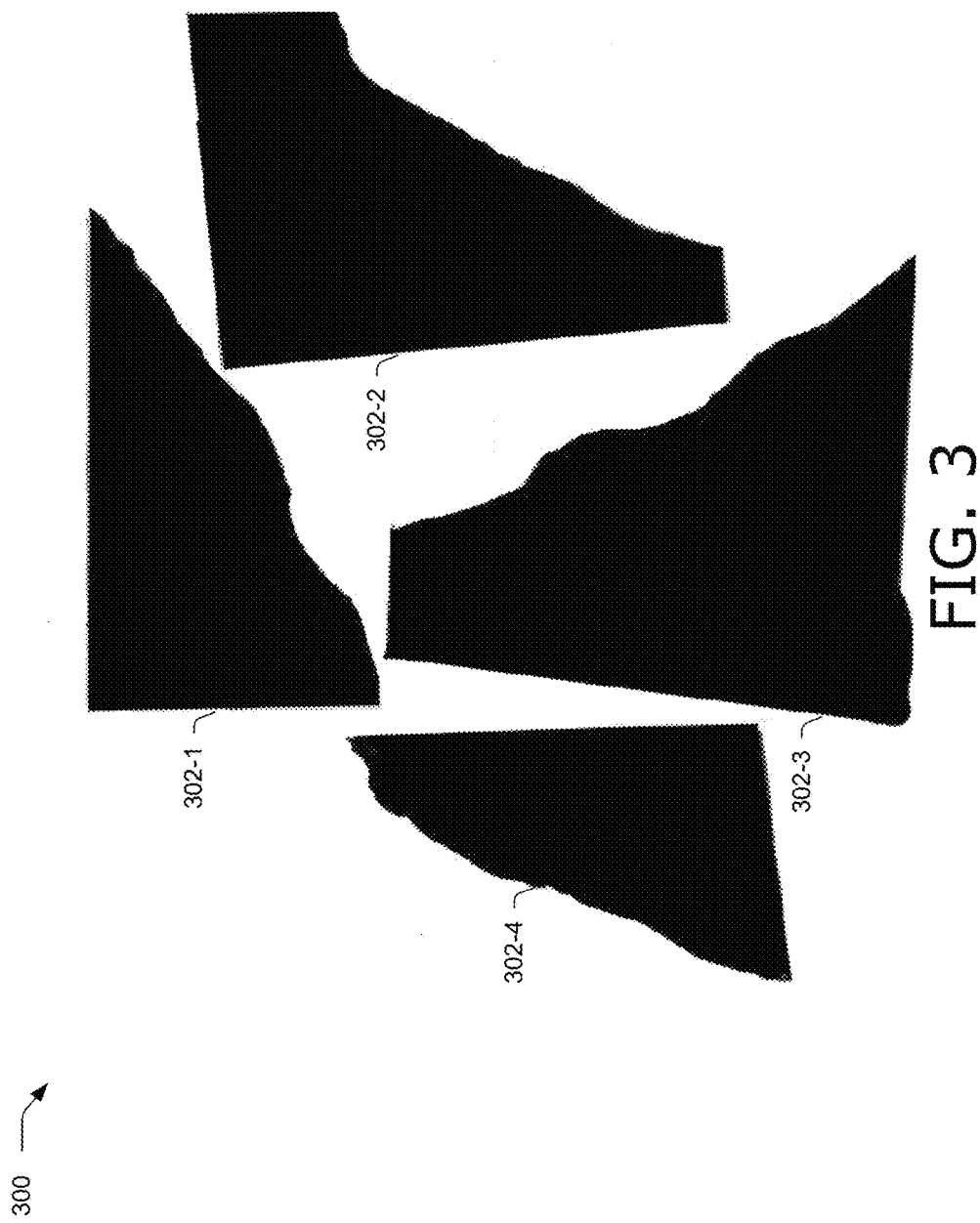
FIG. 3 illustrates example masks of example image sections in accordance with one or more aspects of the disclosure.

As an example of masks generated by mask generation module 146, consider FIG. 3 which illustrates example masks 300 of example image sections in accordance with one or more aspects of the disclosure. For instance, the masks illustrated in FIG. 3 correspond to the image sections illustrated in FIG. 2. Specifically, masks 302-1, 302-2, 302-3, and 302-4 in FIG. 3 correspond to image sections 202-1, 202-2, 202-3, and 202-4 in FIG. 2, respectively. In this example, pixels of the masks 302-1, 302-2, 302-3, and 302-4 are shaded black, and the masks do not contain content of the corresponding image sections (e.g., content of the family photograph). However, the masks describe the shapes of the image sections.

Returning again to FIG. 1, mask generation module 146 provides masks for each of the image sections to shape matching module 148.

Shape matching module 148 is representative of functionality configured to determine first matching image sections (e.g., first pairs of matching image sections) of the image sections based on the shapes of the image sections described by the masks provided from mask generation module 146. Shape matching module 148 matches image sections based on shape in any suitable way, such as by computing moments for each side, or edge, of each mask, and computing a shape matching score between pairs of masks based on the computed moments. A side (or edge) of a mask can be any suitable portion of the circumference (e.g., perimeter) of a mask assigned by shape matching module 148.

For instance, let i=1 N and j=1 M represent the $i^{th}$ and $i^{th}$ side of first and second masks A and B, respectively (e.g., mask A has N sides and mask B has M sides in this example). Furthermore, let $\mu_i^A$ denote a suitable measure of shape for edge i of mask A, and let $\mu_j^B$ denote a suitable measure of shape for edge j of mask B. In one example, measure $\mu$ is a hue moment. A moment for each side of each mask is calculated according to $m_i^A = \text{sign}(\mu_i^A) \cdot \log \mu_i^A$ $m_j^B = \text{sign}(\mu_j^B) \cdot \log \mu_j^B$ A shape matching score between masks A and B can be determined from the respective moments $m_i^A$ and $m_j^B$. For instance, a shape matching score between masks A and B is determined for each pair of edges of masks A and B according to $$s_{i\times j}^{A,B} = |m_i^A - m_j^B|$$

where × denotes Cartesian product. Hence, N·M shape matching scores $s_{i\times j}^{A,B}$ are calculated. An overall shape matching score between masks A and B can be determined from the shape matching scores $s_{i\times j}^{A,B}$ in any suitable way, such as forming a sum of all or some of the $s_{i\times j}^{A,B}$ (e.g., a weighted sum where weights are determined in any suitable way, e.g., based on a confidence factor derived from a relative quality of an edge, where a frayed edge may indicate poor quality (and hence low confidence) and a straight, crisp edge may indicate good quality (and hence high confidence)). In one example, an overall matching score $S^{A,B}$ between masks A and B, is determined from the minimum of the shape matching scores $s_{i\times j}^{A,B}$ or $$s^{A,B} = \min_{i,j} s_{i\times j}^{A,B}.$$

By comparing shape matching scores between masks, matching image sections can be determined, and assigned to an image. For instance, edges between two masks that have the lowest shape matching score among all edges and all masks may be used to determine that the two masks correspond to a pair of matching images along the edge with lowest shape matching score, and belong to a common image. In one example, a shape matching score may be required to be below a prescribed threshold value to declare that a pair of image sections (or masks) match.

Figure 4:
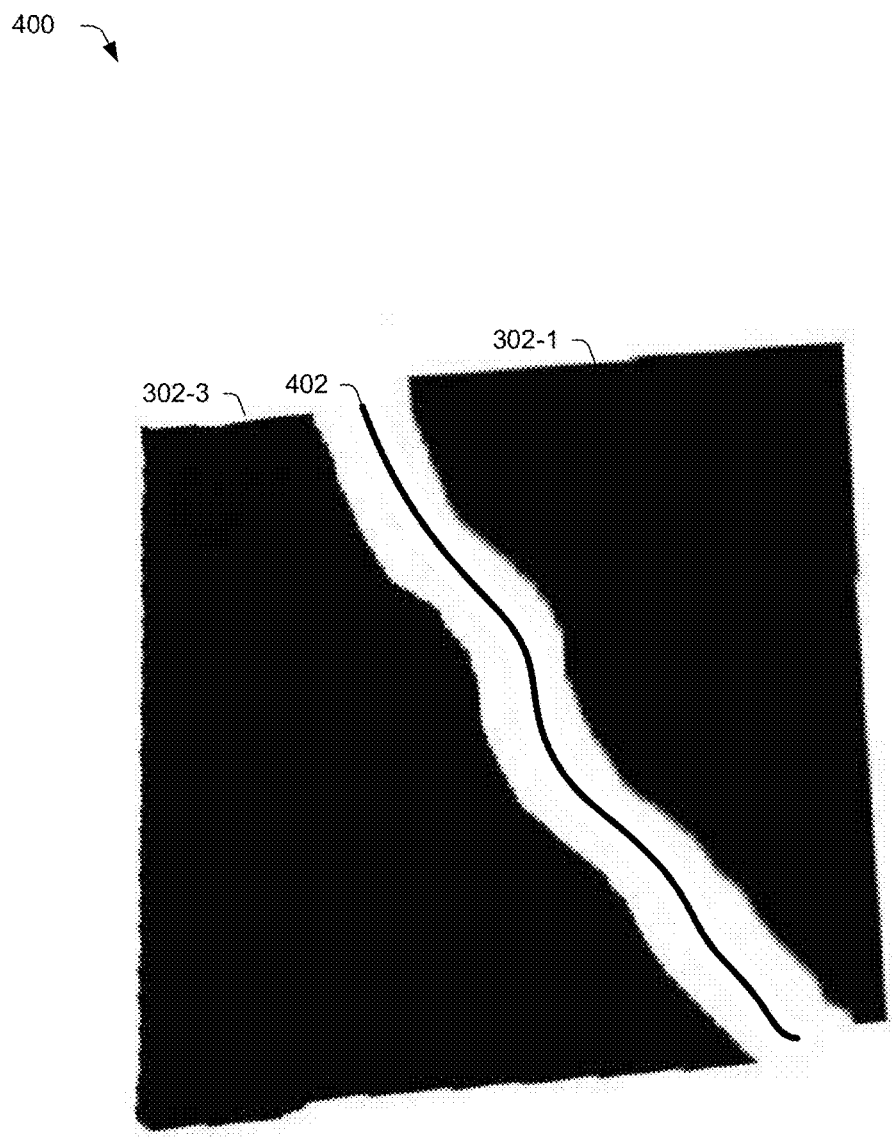
FIG. 4 illustrates example matching masks corresponding to matching image sections based on shapes of the image sections in accordance with one or more aspects of the disclosure.

As an example of masks generated by mask generation module 146, consider FIG. 4 which illustrates example matching masks 400 corresponding to matching image sections based on shapes of the image sections in accordance with one or more aspects of the disclosure. Matching masks 400 include masks 302-3 and 302-1 from FIG. 3 that have been reassembled along contour 402. Contour 402 follows an edge of mask 302-3 (e.g., the right side of mask 302-3 in FIG. 4) and an edge of mask 302-1 (e.g., the left side of mask 302-1 in FIG. 4). By calculating shape matching scores based on the shapes of masks as described above, shape matching module 148 determines that mask 302-3 and mask 302-1 have the best shape matching score (e.g., the lowest shape matching score $s_{i\times j}^{A,B}$) along contour 402. Accordingly, and because the shape matching score along contour 402 between mask 302-3 and mask 302-1 may be less than a threshold score level, shape matching module 148 denotes mask 302-3 and mask 302-1 as matching, and thus respective image sections to mask 302-3 and mask 302-1 (e.g., image section 202-3 and image section 202-1 in FIG. 2) are a pair of first matching image sections determined by shape matching module 148.

Returning again to FIG. 1, shape matching module 148 analyzes the masks according to their shapes to determine matching image sections (e.g., pairs of matching image sections), as described above. Hence, an image section may be included in one or more pairs of matching image sections, since an image section can match different image sections along different edges. The matching image sections determined by shape matching module 148, along with any suitable information, such as shape matching scores, confidence factors, numbers of images represented by the image sections, numbers of edges of image sections, and the like, used by or calculated by shape matching module 148 are stored in shape data 132 of storage 126.

Shape matching module 148 provides first matching image sections (e.g., pairs of matching image sections based on shapes indicated by masks, including any suitable metadata with the first matching image sections, such as a table indicating how many image sections have been matched according to shape, a number of unmatched image sections, shape matching scores, a number of images represented by the image sections, numbers of edges of image sections, and the like) to ambiguity module 150.

Ambiguity module 150 is representative of functionality configured to make a determination of ambiguity based on first matching image sections from shape matching module 148. A determination of ambiguity can indicate whether each image section is uniquely matched in the first matching image sections generated by shape matching module 148. For instance, a determination of ambiguity can indicate an ambiguity when at least one image section is not included in the first matching image sections generated by shape matching module 148 (e.g., not all image sections identified by scan module 144 are included at least one pair of matching images in first matching image sections generated by shape matching module 148). Additionally or alternatively, a determination of ambiguity can indicate an ambiguity when a contour (e.g., corresponding to an edge or side) of one image section is matched in multiple pairs of matching image sections in first matching image sections generated by shape matching module 148 (e.g., image sections are redundantly matched along a contour). A determination of ambiguity indicates a lack of ambiguity when not indicating an ambiguity. Hence, when all image sections identified by scan module 144 are uniquely matched in first matching image sections generated by shape matching module 148 (e.g., there are no redundant matches or unmatched image sections), a determination of ambiguity is made by ambiguity module 150 indicating a lack of ambiguity. In this case, image sections can be reassembled based on their shapes, without examining their content (e.g., features of content in an image section).

Ambiguity module 150 can make a determination of ambiguity for one or more images. For instance, when multiple images are represented by image sections in a scan obtained by scan module 144, and a first image of the images has all uniquely matched image sections while a second image has redundantly matched image sections (e.g., multiple image sections matched to an edge of an image section), ambiguity module 150 can generate a determination of ambiguity for the first image that indicates a lack of ambiguity and a determination of ambiguity for the second image that indicates an ambiguity.

A determination of ambiguity made by ambiguity module 150 is stored in ambiguity data 136 in storage 126. Furthermore, ambiguity module 150 can generate any suitable metadata and store it in ambiguity data 136, such as identifiers of unmatched image sections, identifiers of redundantly matched image sections, an indicator whether all image sections are uniquely matched based on their shape, and the like). Such metadata can be generated for each image represented by image sections in a scan obtained by scan module 144, and grouped in any suitable data structure. Ambiguity module 150 provides a determination of ambiguity and any suitable metadata it generates to feature matching module 152.

Feature matching module 152 is representative of functionality configured to extract features of content from image sections and determine second matching image sections (e.g., second pairs of matching image sections) of image sections in a scan obtained by scan module 144 based on the extracted features of content. Feature matching module 152 can extract features of content and determine second matching image sections from any suitable image sections. In one example, feature matching module 152 determines second matching image sections from image sections that are not uniquely matched by shape matching module 148 (e.g., feature matching module 152 may not process image sections that are uniquely matched based on their shapes, as determined by shape matching module 148). Additionally or alternatively, feature matching module 152 may process any suitable number of image sections (e.g., each image section in a scan obtained by scan module 144) and determine second matching image sections from these image sections. Hence, determining second matching image sections by feature matching module 152 may include modifying first matching image sections determined by shape matching module 148 (e.g., removing a pair of matching images from first matching image sections that have been re-matched according to features of content by feature matching module 152).

Furthermore, feature matching module 152 extracts features of content from image sections with any suitable feature extractor. In one example, the features of content of image sections are extracted with a rotationally-invariant feature descriptor, such as an oriented-fast and rotated-brief (ORB) descriptor. Additionally or alternatively, feature matching module 152 extracts features with a scale-invariant feature transform (SIFT), speeded-up robust features (SURF), an edge detector, a corner detector, a blob detector, a color detector, a texture detector, combinations thereof, and the like.

By extracting features of content from image sections, and not relying on a shape or contour of a mask like shape matching module 148, feature matching module 152 can determine second matching image sections and resolve ambiguities indicated by ambiguity module 150. For instance, features of content extracted from image sections can be used to match image sections by preserving continuity of content across image sections that is not possible when relying on shapes of masks.

Figure 5:
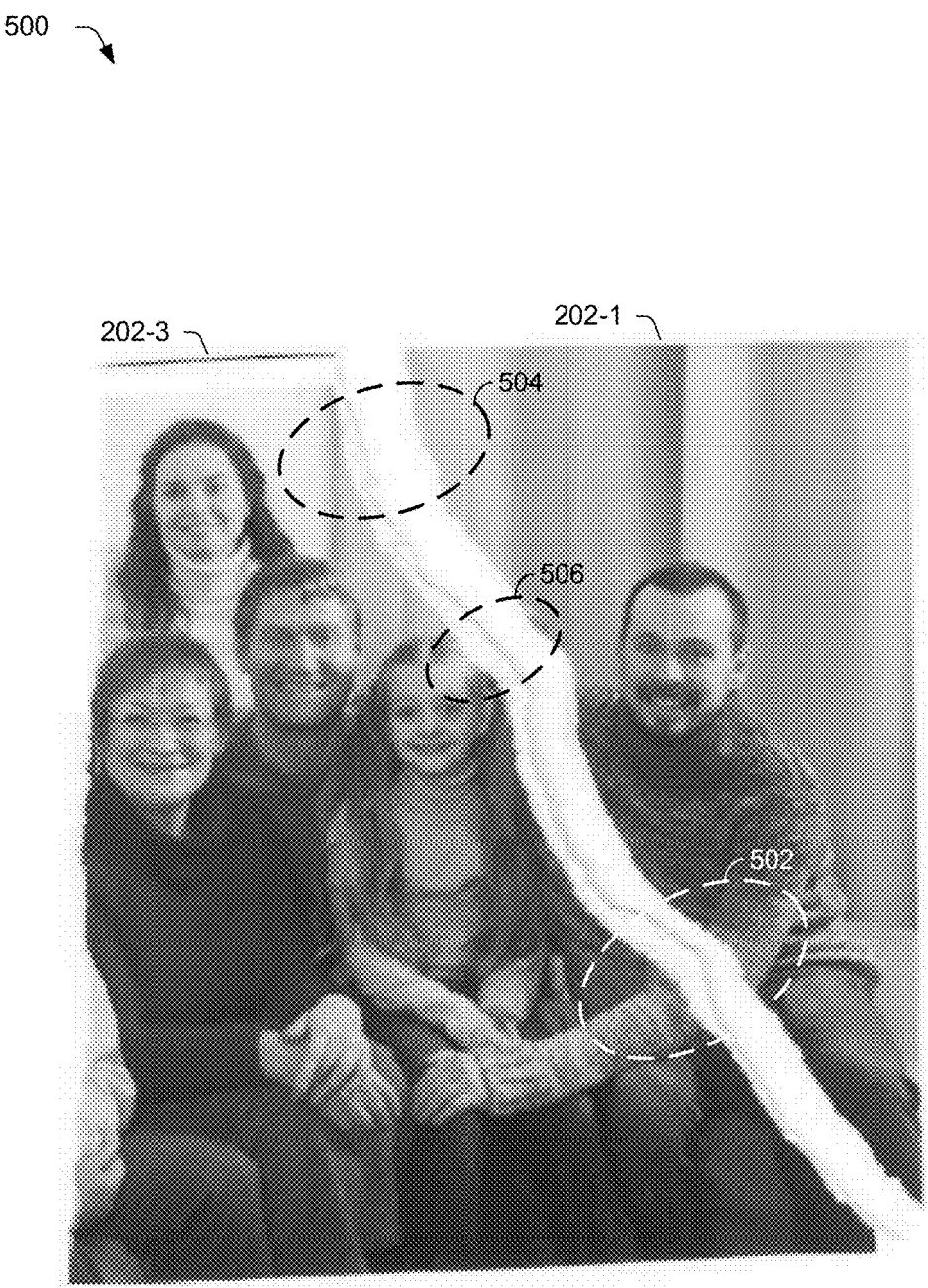
FIG. 5 illustrates example matching image sections based on features of content of the image sections in accordance with one or more aspects of the disclosure.

As an example of using extracted features to preserve continuity of content across image sections, consider FIG. 5 which illustrates example matching image sections 500 based on features of content of the image sections in accordance with one or more aspects of the disclosure. Matching image sections 500 includes image section 202-1 and image section 202-3 from FIG. 2. In this example, image section 202-1 and image section 202-3 may not satisfy a threshold requirement for being matched according to shape by shape matching module 148 (e.g., a shape matching score $s_{i \times j}^{A,B}$ between image section 202-1 and image section 202-3 may be too high). For instance, in region 502 in FIG. 5, the edge of image section 202-3 is frayed, which may prevent the image sections from being matched by shape (e.g., contour along the frayed edge).

Hence, feature matching module 152 extracts features of content from image section 202-1 and image section 202-3. In the example in FIG. 5, features of content in region 502 are extracted from image section 202-1 and image section 202-3. Extracted features may include the shape of the arm in region 502 based on edge detection techniques (e.g., the width of the arm), texture of the sweater, color of the sweater, reflectivity of light, shadows, combinations thereof, and the like. Despite image section 202-3 being frayed in region 502, continuity of the extracted features across image section 202-1 and image section 202-3 in region 502 (e.g., the arm of the individual in image section 202-1) indicate that image section 202-1 and image section 202-3 are matching image sections (e.g., a pair of matching image sections).

Furthermore, feature matching module 152 may calculate a feature matching score between image sections. For instance, features may be extracted along multiple points of a contour (e.g., an edge of an image section), individually scored according to feature, and the individual feature scores combined to form a feature matching score between the image sections. For example, features may be extracted regarding the background of image section 202-1 and image section 202-3 in FIG. 5 in region 504 (e.g., the color and pattern of a curtain in the background), and a feature may be extracted in region 506 (e.g., the color of the young girl's hair). Each of the features in the regions (e.g., regions 502, 504, and 506) may be individually scored, in any suitable way. In one example, a texture feature of the sweater in region 502 is given a high score (e.g., 9 out of ten), a color feature of the sweater in region 502 is also given a high score (e.g., 9.1 out of ten), a pattern feature in region 504 is given a medium score (e.g., 6 out of ten), and a color feature in region 506 may be given a poor score (e.g., 2.5 out of ten) based on a poor color match in region 506.

A feature matching score between image section 202-1 and image section 202-3 can be obtained by combining the individual feature scores in any suitable way, such as by forming an average (e.g., a weighted average) of individual scores. Using the four features in the three sections with the example rating system out of ten described above, and feature matching score may be calculated as a mean of the individual scores, or $E\{9, 9.1, 6, 2.5\}=6.65$ out of ten, where $E\{\cdot\}$ denotes expectation. Any suitable scale and format for the feature matching score can be used, and the scale out of ten is one example. Furthermore, any suitable number of features in any suitable number of regions may be used to determine a feature matching score, in any suitable way. In one example, a feature matching score between two image sections is set as a best (e.g., highest) individual feature score. In the example in the scale out of ten above, the feature matching score set in this way would be set to 9.1 out of ten.

Returning again to FIG. 1, feature matching module 152 determines second matching image sections (e.g., second pairs of matching image sections) based on extracted features of content from image sections. In one example, feature matching module 152 determines second matching image sections based on feature matching scores of extracted features, as described above. For instance, a feature matching score between two image sections may satisfy a threshold constraint (e.g., be above a predetermined threshold, such as 7 out of ten) to determine that a pair of image sections are second matching image sections determined by feature matching module 152.

In one example, feature matching module 152 resolves all ambiguities reported by ambiguity module 150 by forming pairs of matched images (e.g., unique pairs) based on features extracted from image pieces. For instance, despite a threshold on a feature matching score not being satisfied (e.g., the feature matching score is too low), feature matching module 152 forms pairs of matched image sections based on best (e.g., highest) feature matching sections between the image sections so that all image sections are consequently matched and a composite image can be automatically formed.

Furthermore, feature matching module 152, may group matching image sections into any suitable data structure, such as by filling in fields of image sections and image sides (e.g., edges) for pairs of matching image sections. Matching image sections determined by feature matching module 152 (e.g., second matching image sections) are stored in feature data 134 in storage 126. Furthermore, storage 126 can store any data calculated by or used by feature matching module 152, such as feature matching scores, and make that data available to any module of image restoration system 110. Moreover, feature matching module 152 provides second matching image sections (e.g., second pairs of matching image sections) to composite image module 154, together with any suitable data calculated by or used by feature matching module 152, such as feature matching scores.

Composite image module 154 is representative of functionality configured to reassemble image sections into one or more composite images based on first matching image sections from shape matching module 148, second matching image sections from feature matching module 152, or combinations thereof. In one example, responsive to a determination of ambiguity from ambiguity module 150 indicating a lack of ambiguity, composite image module 154 reassembles image sections based on first matching image sections from shape matching module 148 (e.g., first pairs of matching image sections determined from shapes of masks of image sections, as described above). Responsive to a determination of ambiguity from ambiguity module 150 indicating an ambiguity, composite image module 154 reassembles image sections based on first matching image sections from shape matching module 148 and second matching image sections from feature matching module 152 (e.g., second pairs of matching image sections determined from features of content of image sections, as described above).

When image sections of a scan obtained by scan module 144 represent multiple images, composite image module 154 can assign each image section to one of multiple composite images (e.g., based on first matching image sections from shape matching module 148, second matching image sections from feature matching module 152, or combinations thereof). The composite images represent the multiple images. In one example, composite image module 154 simultaneously reassembles image sections into multiple composite images.

Composite images reassembled by composite image module 154 are stored in composite data 138 in storage 126, and provided to compensation module 156. In one example, a composite image generated by composite image module 154 is automatically displayed on display 122.

Figure 6:
FIG. 6 illustrates an example composite image in accordance with one or more aspects of the disclosure.

As an example of a composite image constructed from image sections by composite image module 154, consider FIG. 6 which illustrates an example composite image 600 in accordance with one or more aspects of the disclosure. Composite image 600 in FIG. 6 is formed by reassembling, with composite image module 154, image sections 202 in FIG. 2, based on first matching image sections from shape matching module 148 and second matching image sections from feature matching module 152. The image sections have been stitched together according to matching edges of matching pairs of matching image sections to form composite image 600.

Furthermore, composite image 600 has been repaired by adding material to composite image 600, such as adding material absent in composite image 600 to composite image 600. For instance, region 602 represents a region of composite image where a hole has been filled. A hole or gap may exist in a composite image when image pieces are reassembled by composite image module 154, such as from a frayed edge of an image piece. In the example in in FIG. 600, region 602 has been filled with material from an image other than other than composite image 600 or image sections 202, such as an image obtained from a database of images, a user's gallery of images, a user's social media account, an image obtained by image gallery module 142 in FIG. 1, combinations thereof, and the like.

Additionally or alternatively, region 602 can be filled with material from composite image 600, such as material from region 604 (e.g., with a content-aware-fill tool). Region 604 contains material of a similar texture and color with a similar shading and lighting to absent material lost in a hole or gap, and may be used to fill region 602. Material is added to composite image 600 by compensation module 156.

Returning again to FIG. 1, compensation module 156 is representative of functionality configured to repair a composite image. In one example, compensation module 156 adds material absent in a composite image to the composite image. For instance, compensation module 156 has access to images obtained by image gallery module 142 to repair a composite image, including images from a user's photo gallery (e.g., an online photo sharing service, images stored in a user's image editing application, such as Photoshop®), images a user has posted in a social media post, blog, online comment, images a user has attached to an email, text, or other communication, images a user has posted on an image sharing service, a database of stock images, and the like. Hence, compensation module 156 can add content from any suitable image to a composite image, such as to fill a hole, or a gap between image sections.

Furthermore, compensation module 156 can perform any suitable type of compensation to repair a composite image, such as harmonization, adjusting lighting, color, shading, brightness contrast, applying a filter, blending, and the like to one or more regions of a composite image. In one example, gaps between image sections in a composite image are filled with material from an image section or another image, and blended by compensation module 156. Accordingly, a compensated composite image generated by image restoration system 110 accurately reassembles and repairs image sections (e.g., torn image pieces) so that the compensated composite image is indistinguishable from the original image before it was torn, and does so automatically and without user intervention, reducing cost and saving time compared to traditional systems.

Compensation data, such as a compensated composite image and compensation parameters (e.g., an amount of blending, an indicator of a filter, a location of an image or image section where material is copied from, a location of a composite image where material is added, and the like), is stored in composite data 138 in storage 126. Furthermore, a composite image before and after compensation by compensation module 156 can be displayed on any suitable display, such as display 122.

Having considered an example digital medium environment, consider now a discussion of an example system usable to reassemble and repair image sections automatically and without user intervention.

Example Image Restoration System

Figure 7:
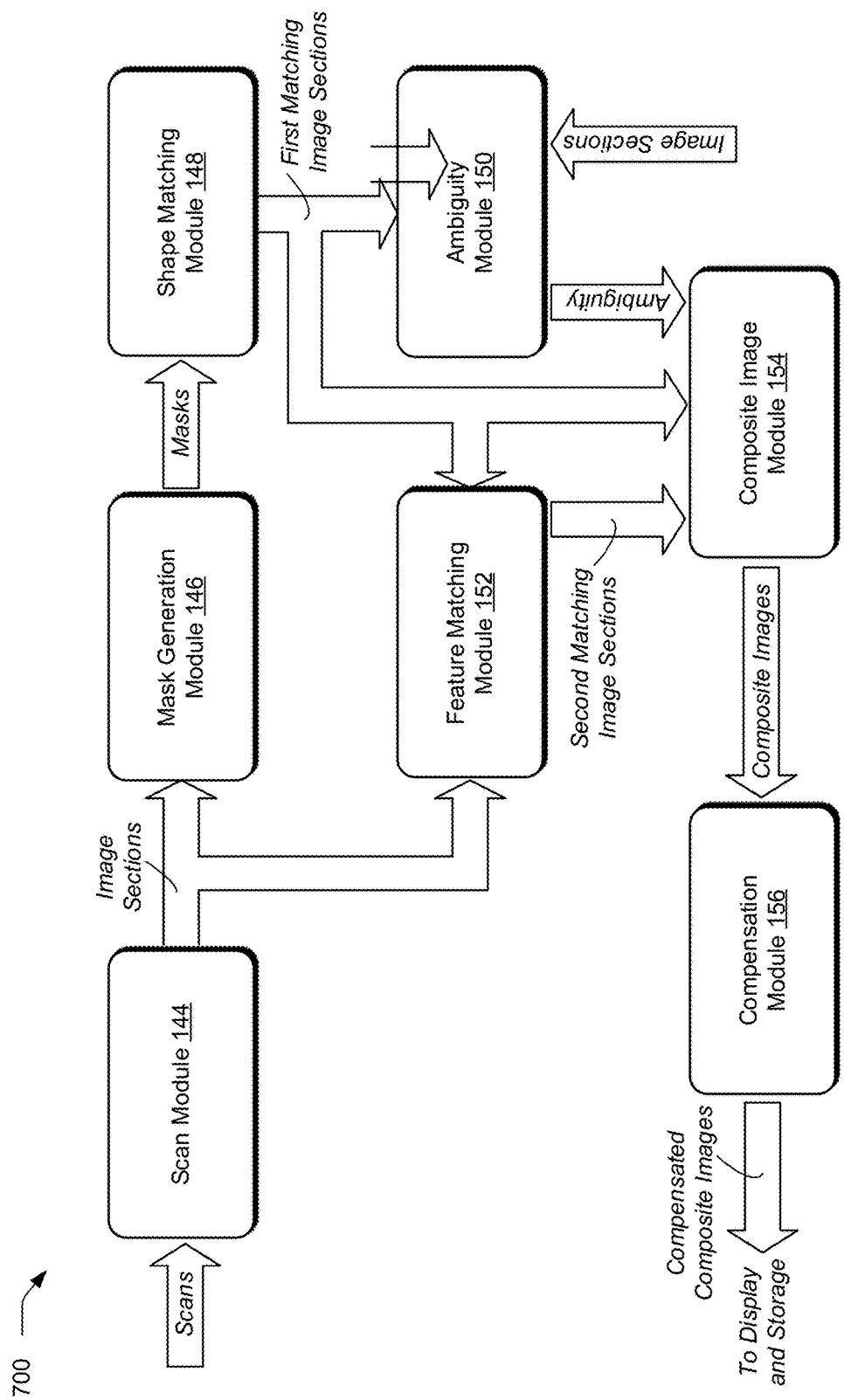
FIG. 7 illustrates an example system usable to reassemble and repair torn image pieces in accordance with one or more aspects of the disclosure.

FIG. 7 illustrates an example system 700 usable to reassemble and repair torn image pieces in accordance with one or more aspects of the disclosure. In this implementation, system 700 includes the modules of image restoration application 120 as described in FIG. 1, e.g., scan module 144, mask generation module 146, shape matching module 148, ambiguity module 150, feature matching module 152, composite image module 154, and compensation module 156. System 700 is one example of image restoration system 110 that can be constructed using the modules of image restoration application 120. For instance, signals can be redefined, and modules can be modified, combined, divided, added, or removed to form a modified system, without altering the functionality of system 700. Accordingly, such modified systems are considered to be within the scope of the disclosure.

Furthermore, for simplicity system 700 is limited to the modules of image restoration application 120 and a description of some of their interconnects. System 700 can, however, include any suitable signals and communications between modules omitted for simplicity. Such signals may include system clocks, counters, image indicators, reset signals, and the like. System 700 can operate automatically and without user intervention. Furthermore, system 700 can operate in real time (e.g., with no perceptible delay to a user once scans are obtained by scan module 144). Accordingly, signals can be calculated by the modules of system 700 and communicated between the modules of system 700 without significant delay, so that a compensated composite image can be generated and displayed without perceptible delay to a user and without user intervention.

Moreover, system 700 can be implemented on any suitable device or devices. In one example, system 700 is implemented on one computing device (e.g., one of computing devices 104 in FIG. 1). In another example, system 700 is implemented on more than one computing device. For instance, parts of system 700 can be implemented by a first computing device, such as computing device 104-1 in FIG. 1, and other parts of system 700 can be implemented by an additional computing device or devices, such as computing device 104-2. In one example, a server implements parts of system 700, such as server 116 in FIG. 1. A server can be remote, e.g., because it is not collocated with the first computing device. A server may be configured to receive signals of system 700 from a computing device (e.g., one or more of computing devices 104), process the received signals, such as with image support system 118, and transmit results of the processing back to the computing device. Hence, image support system 118 of server 116 in FIG. 1 may include system 700.

Additionally or alternatively, parts of system 700 can be implemented by an additional computing device that is collocated with a first computing device. For instance, one of computing devices 104 may be a first computing device, and another of computing devices 104 may be an additional, collocated computing device. The first computing device and the additional computing device may be operated by one or more users. Hence, system 700 provides for multiple users within an environment to share data included in system 700. For instance, a scan obtained by scan module 144 on a first computing device may be provided together with matching image sections to another computing device, which reassembles and repairs image sections based on the matching image sections.

Scan module 144 obtains one or more scans. Each scan includes at least one image section (e.g., pieces of a torn, printed image). A scan obtained by scan module 144 may include all image sections from an image. Additionally or alternatively, image sections of an image may be spread across multiple scans obtained by scan module 144. Furthermore, scans obtained by scan module 144 may be of any suitable format. In one example, a first scan obtained by scan module 144 is in a first format (e.g., portable document format (PDF)), and a second scan obtained by scan module 144 is in a second format (e.g., joint photographic experts group (JPEG)).

Scan module 144 identifies image sections in scans obtained by scan module 144, such as by separating image sections in a foreground of a scan from a background of the scan with graph cut techniques, and provides the image sections to mask generation module 146 and feature matching module 152. Image sections identified by scan module 144 can be provided to other modules of system 700 in any suitable format and way. In one example, providing image sections by scan module 144 includes providing scans obtained by scan module 144 together with indicators (e.g., locations in the scans) of image sections identified by scan module 144. Hence, scan module 144 can provide any suitable metadata with image sections, such as a list of image sections with names, numbers, sizes, and the like of the image sections. Additionally or alternatively, image sections may be extracted from a scan obtained by scan module 144 and provided to modules of system 700 separate from scans obtained by scan module 144.

Mask generation module 146 receives image sections and metadata regarding the image sections from scan module 144 and generates a respective mask for each image section. A mask for each image section is generated by mask generation module 146 that describes the shape (e.g., contour) of the image section without describing the content of the image section. An example of a mask for an image section is a pixel-by-pixel bit map that includes a binary indicator for each pixel of a scan indicating whether the pixel is included in an image section. In one example, pixels of a mask are assigned a color, such as black. Additionally or alternatively, masks generated by mask generation module 146 are assembled in a list of masks in an order, such as an order according to shape (e.g., largest to smallest). Each mask is linked to a respective image section, such as with an indicator of a respective image section. Masks generated by mask generation module 146 are provided to shape matching module 148. Mask generation module 146 can provide an ordered list of masks to shape matching module 148.

Shape matching module 148 determines first matching image sections (e.g., pairs of matching image sections) of the image sections based on the masks provided from mask generation module 146. For instance, shape matching module 148 determines first matching image sections based on the respective shape of each image section described by the respective mask for each image section. In one example, shape matching module 148 breaks the perimeter of each image section into any suitable number of segments (e.g., edges or sides of the image section), and determines pairs of matching image sections along a contour corresponding to a respective edge of the matching image sections (e.g., as described earlier regarding FIG. 4).

Additionally or alternatively, shape matching module 148 can determine first matching image sections by calculating, for a respective side of each image section (e.g., edge or segment of the perimeter of each image section), a respective moment from the masks provided by mask generation module 146. A moment can be determined from hue moments of image sections along a contour, such as determined from a product of a signum of a hue moment and a logarithm of the hue moment, as described above. Shape matching module 148 can determine a shape matching score between one image section and an additional image section based on a difference of the moments for the one image section and the additional image section, and determine whether the first matching image sections includes the one image section and the additional image section based on the shape matching score along a contour.

In one example, shape matching module 148 orders matching image sections in a list of image sections, such as by re-ordering a list of masks provided by mask generation module 146 to reflect pairs of matching image sections (e.g., by placing indicators of pairs of matching image sections sequentially in a list (e.g., with elements of pairs in different columns or interleaved in a single column), placing masks of unmatched image sections at a bottom of the list, grouping pairs of matching image sections in a list based on which image the image pairs belong, (e.g., when a scan or scans obtained by scan module 144 include image sections from a plurality of images), and the like.

Shape matching module 148 determines first matching image sections including any suitable metadata. Metadata can include indicators of pairs of matching image sections along contours of edges, indicators of edges of image sections for which image sections are determined to be matched, indicators of image sections that are not matched by shape matching module 148 based on shapes of image sections indicated by masks (e.g., unmatched image sections that do not meet matching criteria, such as too high or too low a shape matching score relative to a threshold shape matching level), shape matching scores, an indicator whether all image sections are uniquely matched (e.g., there are no redundant matches (two or more matching image sections) along a contour, and the like. Shape matching module 148 provides first matching image sections including metadata to ambiguity module 150 and composite image module 154. In one example, a list of pairs of matching image sections generated by shape matching module 148 is provided with first matching image sections.

Ambiguity module 150 makes a determination whether each image section in scans obtained by scan module 144 is uniquely matched in first matching image sections received by shape matching module 148. Hence, ambiguity module 150 may receive image sections from scan module 144. Making a determination whether each image section is uniquely matched in first matching image sections can include making a determination of ambiguity. A determination of ambiguity is a binary indicator of ambiguity that indicates an ambiguity when at least one image section in scans obtained by scan module 144 is not included in at least one pair of image sections in first matching image sections received from shape matching module 148. Additionally or alternatively, a determination of ambiguity indicates an ambiguity when a contour of one image section (e.g., an edge or segment of the perimeter of an image section) is matched in multiple pairs of image sections received from shape matching module 148.

A determination of ambiguity indicates a lack of ambiguity when not indicating an ambiguity. Hence, when a determination of ambiguity indicates a lack of ambiguity, ambiguity module 150 determines that each image section in scans obtained by scan module 144 is uniquely matched in first matching image sections received by shape matching module 148. Otherwise, when a determination of ambiguity indicates an ambiguity, ambiguity module 150 determines that each image section in scans obtained by scan module 144 is not uniquely matched in first matching image sections received by shape matching module 148. Ambiguity module 150 provides a determination of ambiguity to composite image module 154.

Additionally or alternatively to determining matching image sections based on shapes of images sections indicated by masks from mask generation module 146, system 700 can determine matching image sections from content of the images sections with feature matching module 152.

Feature matching module 152 determines second matching image sections (e.g., second pairs of matching image sections) based on respective features of content extracted from the image sections. In one example, feature matching module 152 determines second matching image sections by extracting features from each of the image sections identified by scan module 144. Additionally or alternatively, feature matching module determines second matching image sections by extracting features from image sections that are not uniquely matched by shape matching module 148. Hence, feature matching module 152 may receive first matching image sections from shape matching module 148.

Feature matching module 152 extracts features of content using any suitable feature descriptor, such as a rotationally-invariant feature descriptor, that extracts features such as color, texture, lighting, shading, and the like to provide continuity of content across image sections when image sections are matched by feature matching module 152.

In one example, feature matching module 152 determines a pair of matching image sections that is redundant to a pair of matching image sections reported in first matching image sections from shape matching module 148. For instance, along a contour (e.g., edge of a first image section), feature matching module 152 may determine a matching image section to the first image section based on features of content of the image sections, when along the same contour, shape matching module determines a different matching image section to the first image section based on shapes of the image sections. In this case, feature matching module 152 may update a list of first matching image sections generated by shape matching module 148, such as by removing at least some image sections from the list of first matching image sections generated by shape matching module 148. Furthermore, feature matching module 152 may append a list of first matching image sections generated by shape matching module 148 with second matching image sections determined by feature matching module 152. Additionally or alternatively, feature matching module 152 may generate a separate list of second matching image sections determined by feature matching module 152 than a list of first matching image sections generated by shape matching module 148.

Second matching image sections (e.g., second pairs of matching image sections) based on features of content extracted from image sections are provided to composite image module 154. In one example, second matching image sections provided from feature matching module 152 includes information regarding an update to first matching image sections from shape matching module 148, such as an indicator of image sections to be removed from a list of matching image sections (e.g., to resolve a redundancy found between matching images sections by shape and matching image sections by content).

Composite image module 154 reassembles image sections into one or more composite images. In one example, responsive to a determination of ambiguity from ambiguity module 150 indicating a lack of ambiguity, composite image module 154 reassembles image sections into one or more composite images based on first matching image sections (e.g., first pairs of matching image sections) from shape matching module 148. Responsive to a determination of ambiguity from ambiguity module 150 indicating an ambiguity, composite image module 154 reassembles image sections into one or more composite images based on first pairs of matching image sections from shape matching module 148 and second matching image sections (e.g., second pairs of matching image sections) from feature matching module 152. For instance, second matching image sections from feature matching module 152 may be used by composite image module 154 to correct first matching image sections from shape matching module 148, such as removing a pair of matching image sections from first matching image sections.

By reassembling the image sections, composite image module 154 stitches together, or integrates the image sections for each image into a single composite image based on matching image sections determined by at least one of shapes of image sections or features of content of image sections. By simultaneously processing image sections from multiple images (e.g., a photograph and a printed contract) composite image module 154 can reassemble images sections to produce multiple composite images, each one corresponding to one of the multiple images, (e.g., a photograph and a printed contract). Hence, composite image module 154 can assign each image section to a respective one of multiple composite images based on first matching image sections from shape matching module 148, second matching image sections from feature matching module 152, or combinations thereof.

In one example, composite image module 154 reassembles image sections in a same format as a scan containing the image sections. For instance, if scan module 144 obtains a first scan of sections of a photograph in a JPEG format and a second scan of sections of a printed contract in a PDF format, composite image module 154 reassembles a first composite image for the photograph in a JPEG format and a second composite image for the printed contract in a PDF format.

Composite image module 154 provides one or more composite images to compensation module 156. In one example, composite image module 154 includes metadata with the composite images, such as indicators of holes in a composite image, or gaps between image sections in a composite image determined when reassembling the image sections by composite image module 154.

Compensation module 156 repairs a composite image received by composite image module 154 by adding material to a region of the composite image. For instance, compensation module 156 adds material absent in the composite image to the composite image, such as by adding material from an image other than the composite image or the image sections (e.g., an image obtained from a database or photo gallery). In one example, material added to the composite image is obtained from the composite image (e.g., from a different region of the composite image).

Furthermore, compensation module 156 applies any suitable tool, such as a blending tool, shading tool, filter, and the like to repair a composite image, to any suitable portion of a composite image, such as an image section of the composite image, material added to a composite image, a background, a foreground, an isolated object (e.g., a person), combinations thereof, and the like. By repairing one or more composite images provided from composite image module 154, compensation module 156 generates one or more compensated composite images, which can be stored and displayed, such as on display 122 and storage 126 in FIG. 1, respectively.

System 700 constitutes an improvement over systems that manually reassemble torn image pieces and do not use fill material from other images, such as an image editor that requires a high degree of technical skills and training by the user, or sending the image sections to a professional service (e.g., uploading scans of image sections to an online image repair service, which is costly, or providing the image sections to a brick and mortar photo lab). By generating masks for image sections identified in one or more scans, system 700 determines matching image sections along contours (e.g., edges or sides of the image sections) based on shape of the masks, features of content extracted from the image sections, or combinations thereof In one example, matching image sections determined from features of content extracted from the image sections are used to reassemble a composite image when an ambiguity is determined, such as when not all image sections are matched by shapes of the masks, or are redundantly matched so that reassembly of the image pieces based on shapes of the masks is not possible. Furthermore, system 700 can repair a composite image by adding material to the composite image from an additional image (e.g., an image other than the composite image or image sections), which is not possible with systems that rely on fill material obtained from the image sections. Hence, system 700 can automatically and without user intervention generate one or more composite images from torn image pieces quickly, cheaply, and in a repeatable fashion, unlike traditional systems of image repair.

Having considered an example system 700, consider now a discussion of example procedures for reassembling and repairing torn image pieces in accordance with one or more aspects of the disclosure.

Example Procedures

Figure 8:
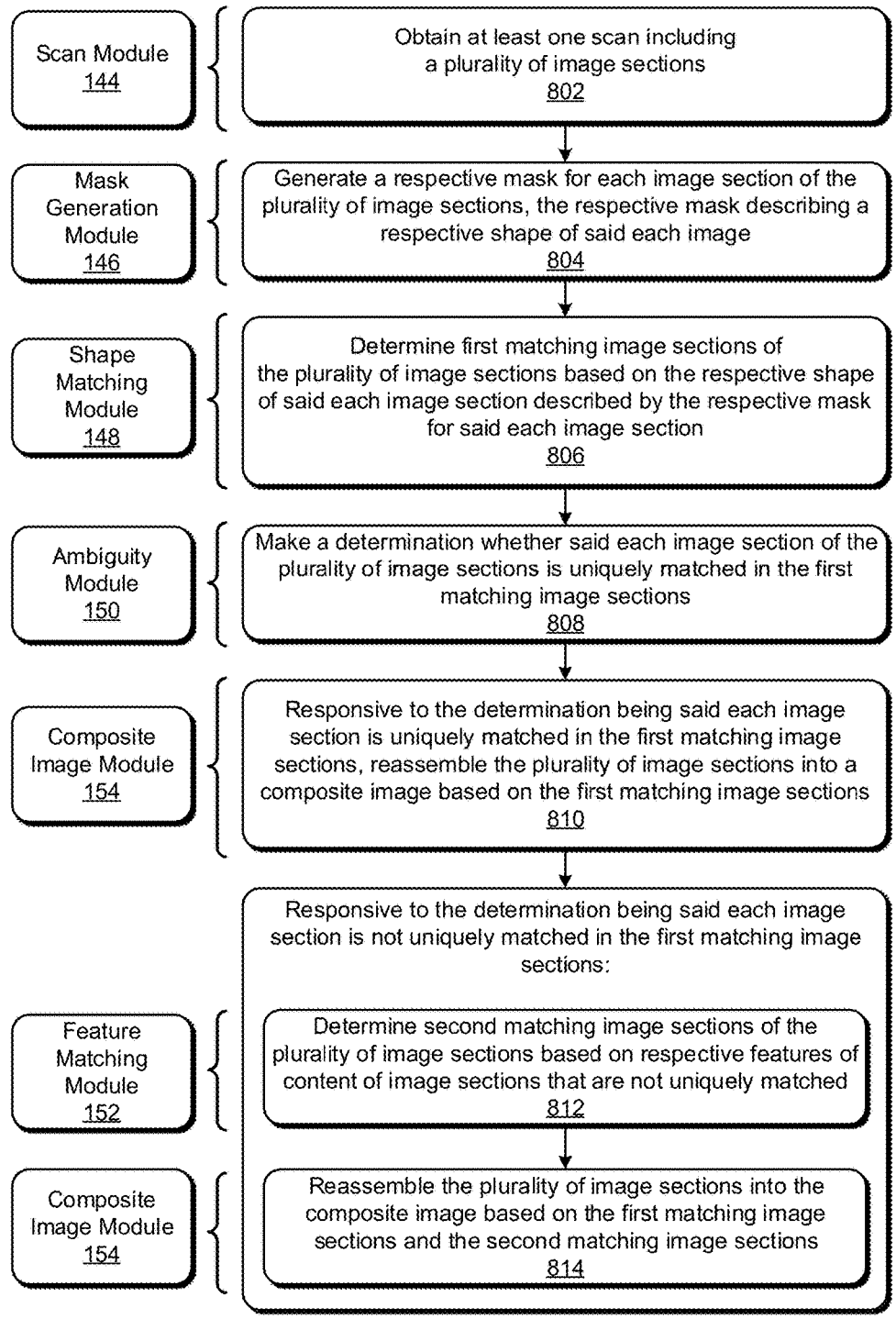
FIG. 8 illustrates a flow diagram depicting an example procedure in accordance with one or more aspects of the disclosure.

FIG. 8 illustrates an example procedure 800 for reassembling and repairing torn image pieces in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 116 of FIG. 1 that makes use of an image restoration system, such as system 700 or image restoration system 110. An image restoration system implementing procedure 800 may be an independent application that has been installed on the computing device, a service hosted by a service provider that is accessible by the computing device, a plug-in module to the computing device, or combinations thereof.

At least one scan is obtained (block 802). The at least one scan includes a plurality of image sections. Block 802 can be performed by scan module 144. In one example, the at least one scan includes multiple scans including image sections from a single image. Additionally or alternatively, the at least one scan can include multiple scans including image sections from multiple images. Multiple scans may be a same type of scan (e.g., format) or different types of scans (e.g., different file formats).

A respective mask for each image section of the plurality of image sections is generated (block 804). A respective mask describes a respective shape of said each image. Block 804 can be performed by mask generation module 146. Generating the respective mask for each image section can include separating the plurality of image sections in a foreground from a background of the at least one scan. In one example, a respective mask for each image section includes binary indicators for pixels of the at least one scan indicating whether said pixels are included in said each image section. For instance, the respective mask for each image section can describe the respective shape of said each image without including content of said each image.

First matching image sections of the plurality of image sections are determined based on the respective shape of said each image section described by the respective mask for said each image section (block 806). Block 806 can be performed by shape matching module 148. In one example, determining first matching image sections comprises obtaining, for a respective side of said each image section, a respective moment from the respective mask for said each image section, determining a matching score between one image section and an additional image section based on a difference of the respective moment corresponding to the one image section and the respective moment corresponding to the additional image section, and determining whether the first matching image sections includes the one image section and the additional image section based on the matching score. For instance, a respective moment can be obtained from a product of a signum of a hue moment determined from the respective side and a logarithm of the hue moment.

A determination is made whether said each image section of the plurality of image sections is uniquely matched in the first matching image sections (block 808). Block 808 can be performed by ambiguity module 150. In one example, making the determination whether said each image section of the plurality of image sections is uniquely matched in the first matching image sections comprises determining whether the first matching image sections include redundant matching images sections, and determining whether the plurality of image sections includes an image section not included in the first matching image sections.

Responsive to the determination being said each image section is uniquely matched in the first matching image sections, the plurality of image sections are reassembled into a composite image based on the first matching image sections (block 810). Block 810 can be performed by composite image module 154. The image sections are reassembled by integrating the image sections (e.g., stitching pixels of the image sections together) according to pairs of first matching image sections along edges of the first matching image sections.

Responsive to the determination being said each image section is not uniquely matched in the first matching image sections, block 812 and block 814 are entered.

Second matching image sections of the plurality of image sections are determined based on respective features of content of image sections that are not uniquely matched (block 812). Block 812 can be performed by feature matching module 152. Respective features of content of the image sections that are not uniquely matched can be extracted from the image sections that are not uniquely matched with a rotationally-invariant feature descriptor.

The plurality of image sections are reassembled into the composite image based on the first matching image sections and the second matching image sections (block 814). Block 814 can be performed by composite image module 154. The image sections are reassembled by integrating the image sections (e.g., stitching pixels of the image sections together) according to pairs of first matching image sections and second matching image sections along edges of the first matching image sections and the second matching image sections.

In one example, the composite image is repaired by adding material to the composite image. The material added can be obtained from the composite image. Additionally or alternatively, material added can be absent from the composite image and obtained from an image other than the composite image or the plurality of image sections (e.g., from a user's image gallery).

Furthermore, the obtaining the at least one scan, the generating the respective mask, the determining the first matching image sections and the second matching image sections, and the reassembling the plurality of image sections into the composite image based on the first matching image sections or based on the first matching image sections and the second matching image sections can be performed automatically and without user intervention.

Figure 9:
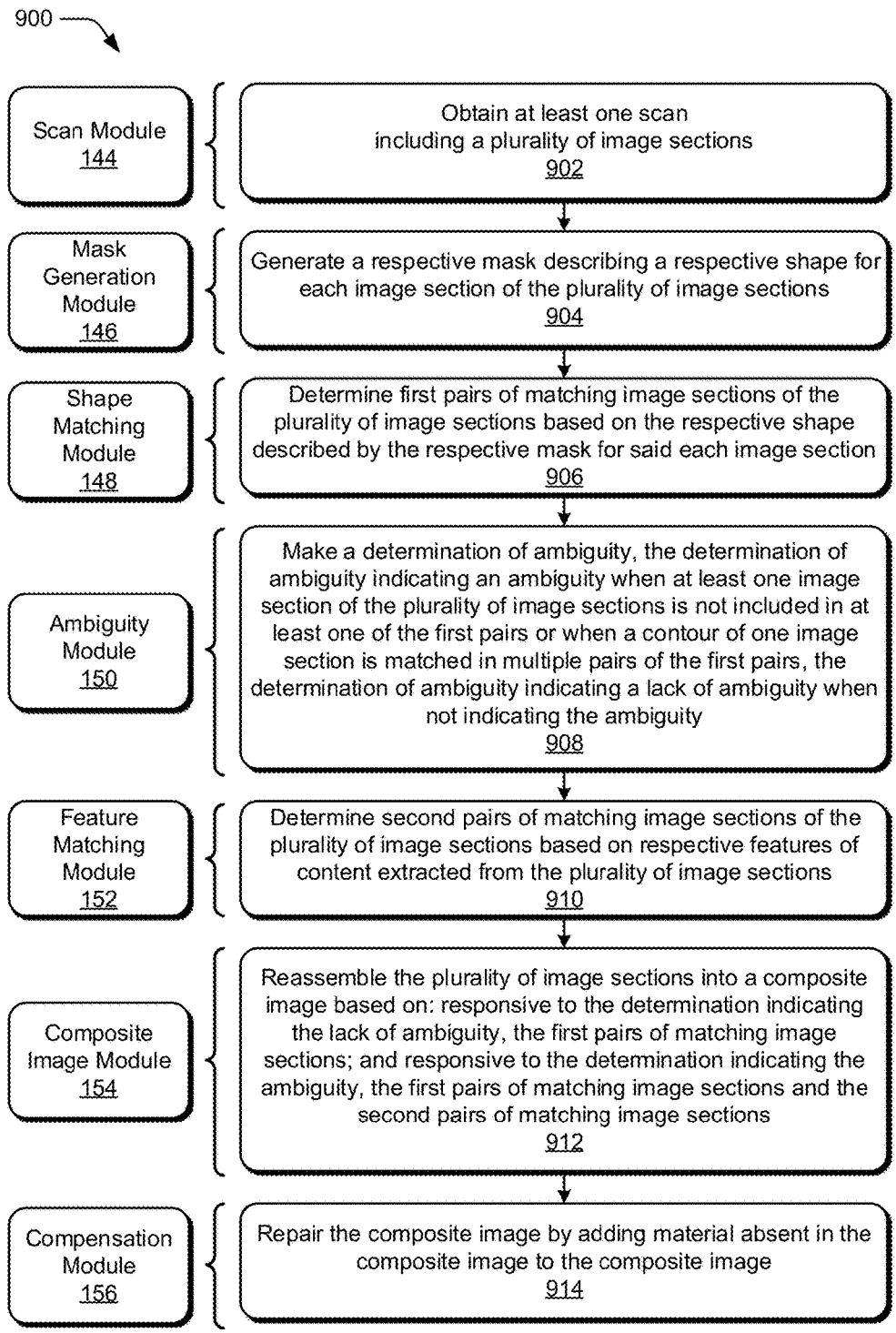
FIG. 9 illustrates a flow diagram depicting an example procedure in accordance with one or more aspects of the disclosure.

FIG. 9 illustrates an example procedure 900 for reassembling and repairing torn image pieces in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 116 of FIG. 1 that makes use of an image restoration system, such as system 700 or image restoration system 110. An image restoration system implementing procedure 900 may be an independent application that has been installed on the computing device, a service hosted by a service provider that is accessible by the computing device, a plug-in module to the computing device, or combinations thereof.

At least one scan including a plurality of image sections is obtained (block 902). A scan can be obtained by scan module 144. In one example, the at least one scan includes multiple scans representing a single image. In another example the at least one scan includes multiple scans representing multiple images. For instance, the multiple images may be different types of images, such as a photograph, document, map, and pages of a book.

A respective mask is generated describing a respective shape for each image section of the plurality of image sections (block 904). A respective mask can be generated by mask generation module 146. A mask does not include context of an image section.

First pairs of matching image sections of the plurality of image sections are determined based on the respective shape described by the respective mask for said each image section (block 906). First pairs of matching image sections can be determined by shape matching module 148. In one example, first pairs of matching image sections are determined based on shape matching scores calculated from moments of masks along a contour (e.g., an edge of the mask).

A determination of ambiguity is made (block 908). A determination of ambiguity can be made by ambiguity module 150. A determination of ambiguity indicates an ambiguity when at least one image section of the plurality of image sections is not included in at least one of the first pairs or when a contour of one image section is matched in multiple pairs of the first pairs. The determination of ambiguity indicates a lack of ambiguity when not indicating the ambiguity.

Second pairs of matching image sections of the plurality of image sections are determined based on respective features of content extracted from the plurality of image sections (block 910). Second pairs of matching image sections can be determined by feature matching module 152.

Second pairs of matching image sections can be determined from features that preserve continuity of content across image sections.

Furthermore, responsive to the determination indicating an ambiguity, at least some pairs of the first pairs of matching image sections can be removed based on the second pairs of matching image sections. For instance, when a second pair of matching image sections that are matched according to features of content extracted from the image sections contradicts a first pair of matching image sections matched according to shapes of masks corresponding to the image sections, the first pair of matching image sections can be removed.

The plurality of image sections are reassembled into a composite image (block 912). The plurality of image sections can be reassembled by composite image module 154. Responsive to the determination indicating the lack of ambiguity, the plurality of image sections are reassembled based on the first pairs of matching image sections. Responsive to the determination indicating the ambiguity, the plurality of image sections are reassembled based on the first pairs of matching image sections and the second pairs of matching image sections.

The composite image is repaired by adding material absent in the composite image to the composite image (block 914). The composite image can be repaired by compensation module 156. In one example, the material absent in the composite image and added to the composite image is obtained from a user library image that does not include the plurality of image sections.

Figure 10:
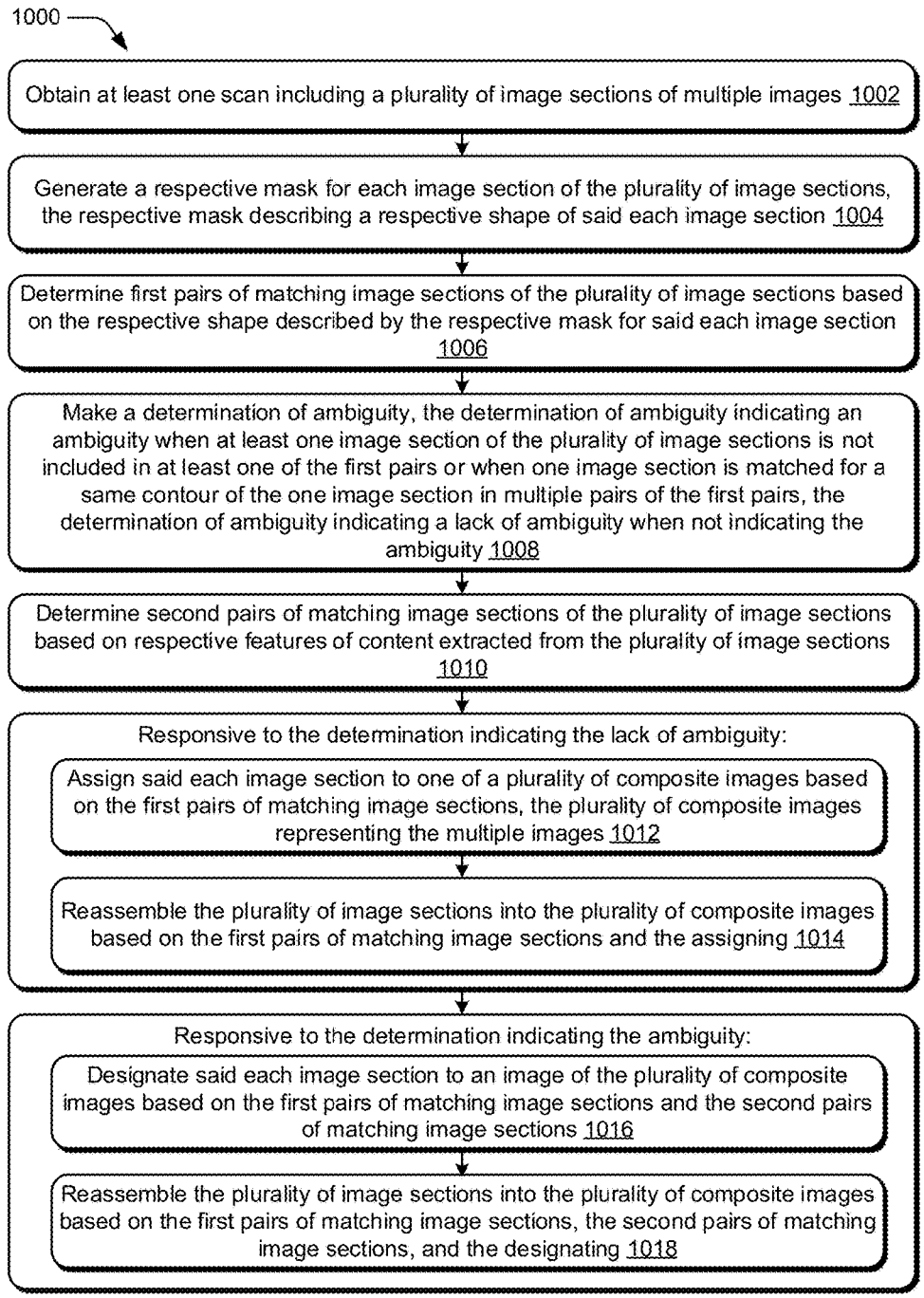
FIG. 10 illustrates a flow diagram depicting an example procedure in accordance with one or more aspects of the disclosure.

FIG. 10 illustrates an example procedure 1000 for reassembling and repairing torn image pieces in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 116 of FIG. 1 that makes use of an image restoration system, such as system 700 or image restoration system 110. An image restoration system implementing procedure 1000 may be an independent application that has been installed on the computing device, a service hosted by a service provider that is accessible by the computing device, a plug-in module to the computing device, or combinations thereof.

At least one scan including a plurality of image sections of multiple images is obtained (block 1002). In one example, the multiple images include different types of documents, at least one of the documents not including a photograph. For instance, one type of document may be a contract (e.g., a lease), and another type of document may be a recipe (e.g., Grandma's secret pie recipe). Additionally or alternatively, the multiple images can include image sections from a same document type, such as multiple pages of a signed lease agreement, book, journal, or the like).

A respective mask for each image section of the plurality of image sections is generated (block 1004). The respective mask describes a respective shape of said each image section, without including content of said each image section.

First pairs of matching image sections of the plurality of image sections are determined based on the respective shape described by the respective mask for said each image section (block 1006). In one example, first pairs of matching image sections are determined based on shape matching scores calculated from moments of masks along a contour (e.g., an edge of the mask).

A determination of ambiguity is made (block 1008). A determination of ambiguity indicates an ambiguity when at least one image section of the plurality of image sections is not included in at least one of the first pairs or when one image section is matched for a same contour of the one image section in multiple pairs of the first pairs. A determination of ambiguity indicates a lack of ambiguity when not indicating the ambiguity.

Second pairs of matching image sections of the plurality of image sections are determined based on respective features of content extracted from the plurality of image sections (block 1010). Second pairs of matching image sections can be determined from features that preserve continuity of content across image sections.

Responsive to the determination indicating the lack of ambiguity, block 1012 and block 1014 are entered.

Said each image section is assigned to one of a plurality of composite images based on the first pairs of matching image sections (block 1012). The plurality of composite images represent the multiple images. A list of matching image sections for each image can be generated and populated with the first pairs of matching image sections assigned to that image.

The plurality of image sections are reassembled into the plurality of composite images based on the first pairs of matching image sections and the assigning (block 1014). Hence, each composite image is reassembled from matching image sections assigned to that image.

Responsive to the determination indicating the ambiguity, block 1016 and block 1018 are entered.

Said each image section is designated to an image of the plurality of composite images based on the first pairs of matching image sections and the second pairs of matching image sections (block 1016). A list of matching image sections for each image can be generated and populated with the first pairs of matching image sections and second pairs of matching image sections designated to that image.

The plurality of image sections are reassembled into the plurality of composite images based on the first pairs of matching image sections, the second pairs of matching image sections, and the designating (block 1018). Hence, each composite image is reassembled from matching image sections designated to that image.

In one example, the plurality of composite images are repaired by adding material to the plurality of composite images. At least some of the material is obtained from an additional image other than the multiple image, such as an image obtained from a user's files, library, gallery of photos, and the like. In one example, the multiple images include images on a film strip and the additional image is on the film strip.

The procedures described herein constitute an improvement over methods that that manually reassemble torn image pieces and do not use fill material from other images, such as using an image editor that requires a high degree of technical skills and training, or sending image sections to a professional service (e.g., uploading scans of image sections to an online image repair service, which is costly, or providing the image sections to a brick and mortar photo lab). By generating masks for image sections identified in one or more scans, the procedures described herein determine matching image sections along contours (e.g., edges or sides of the image sections) based on shapes of the masks, features of content extracted from the image sections, or combinations thereof. In one example, matching image sections determined from features of content extracted from the image sections are used to reassemble a composite image when an ambiguity is determined, such as when not all image sections are matched by shape of the masks, or are redundantly matched so that reassembly of the image pieces based on shape of the masks is not possible. Furthermore, the procedures described herein can repair a composite image by adding material to the composite image from an additional image (e.g., an image other than the composite image or image sections), which is not possible with methods that rely on fill material obtained from the image sections. Hence, the procedures described herein can automatically and without user intervention generate one or more composite images from torn image pieces quickly, cheaply, and in a repeatable fashion, unlike traditional methods of image repair.

Having considered example procedures in accordance with one or more implementations, consider now example systems and devices that can be utilized to practice the inventive principles described herein.

Example Systems and Devices

FIG. 11 illustrates an example system generally at 1100 that includes an example computing device 1102 that is representative of one or more computing systems and devices that may implement the various techniques described herein. This is illustrated through inclusion of image restoration system 110, system 700, image restoration application 120, and image support system 118, which operate as described above. Computing device 1102 may be, for example, a user computing device (e.g., one of computing devices 104), or a server device of a service provider, (e.g., server 116). Furthermore, computing device 1102 may include an on-chip system, multiple computing devices, combinations thereof, or any other suitable computing device or computing system. Accordingly, FIG. 11 illustrates computing device 1102 as one or more of a tablet, a laptop computer, a smart phone, smart eye glasses, and a camera, though these examples are illustrative and in no way are meant to limit the type or number of devices included in computing device 1102.

The example computing device 1102 includes a processing system 1104, one or more computer-readable media 1106, and one or more I/O interfaces 1108 that are communicatively coupled to each other. Although not shown, computing device 1102 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1104 is representative of functionality to perform one or more operations using hardware. Accordingly, processing system 1104 is illustrated as including hardware elements 1110 that may be configured as processors, functional blocks, and so forth. This may include implementation in hardware as an application specific integrated circuit or other logic device formed using one or more semiconductors. Hardware elements 1110 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 124 in FIG. 1 are an example of processing system 1104.

Computer-readable storage media 1106 is illustrated as including memory/storage 1112. Storage 126 in FIG. 1 is an example of memory/storage included in memory/storage 1112. Memory/storage component 1112 may include volatile media (such as random access memory (RAM)), nonvolatile media (such as read only memory (ROM), Flash memory, optical disks, magnetic disks, and so forth), or combinations thereof. Memory/storage component 1112 may include fixed media (e.g., RAM, ROM, a fixed hard drive, and so on) as well as removable media (e.g., Flash memory, a removable hard drive, an optical disc, and so forth). Computer-readable media 1106 may be configured in a variety of other ways as further described below.

Input/output interface(s) 1108 are representative of functionality to allow a user to enter commands and information to computing device 1102, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1102 may be configured in a variety of ways as further described below to support user interaction.

Computing device 1102 also includes applications 1114. Applications 1114 are representative of any suitable applications capable of running on computing device 1102, and may include a web browser which is operable to access various kinds of web-based resources (e.g., assets, media clips, content, configuration files, services, user profiles, and the like). Applications 1114 include image restoration application 120, as previously described. Furthermore, applications 1114 includes any applications supporting image restoration system 110, system 700, and image support system 118.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1102. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1110, or combinations thereof. Computing device 1102 may be configured to implement particular instructions and functions corresponding to the software and hardware modules. Accordingly, implementation of a module that is executable by computing device 1102 as software may be achieved at least partially in hardware, e.g., through use of computer-readable storage media and hardware elements 1110 of processing system 1104. The instructions and functions may be executable/operable by one or more articles of manufacture (for example, one or more computing devices 1102 or processing systems 1104) to implement techniques, modules, and examples described herein.

The techniques described herein may be supported by various configurations of computing device 1102 and are not limited to the specific examples of the techniques described herein. This functionality may also be implemented all or in part through use of a distributed system, such as over a "cloud" 1116 via a platform 1118 as described below.

Cloud 1116 includes and is representative of a platform 1118 for resources 1120. Platform 1118 abstracts underlying functionality of hardware (e.g., servers) and software resources of cloud 1116. Resources 1120 may include applications, data, or applications and data that can be utilized while computer processing is executed on servers that are remote from computing device 1102. Resources 1120 can also include services provided over the Internet, through a subscriber network, such as a cellular or Wi-Fi network, or combinations thereof. Resources 1120 can include asset store 1122, which stores assets, such as images, photographs (e.g., user images in a gallery, a database of stock photographs, and the like), document templates, user profile data, user image libraries, such as photographs posted in a shared photo service, and the like, and may be accessed by computing device 1102.

Platform 1118 may abstract resources and functions to connect computing device 1102 with other computing devices. Platform 1118 may also serve to abstract scaling of resources to provide a corresponding level of scale to encountered demand for resources 1120 that are implemented via platform 1118. Accordingly, in an interconnected device embodiment, implementation of functionality described herein may be distributed throughout system 1100. For example, the functionality may be implemented in part on computing device 1102 as well as via platform 1118 that abstracts the functionality of cloud 1116.

Conclusion

In one or more implementations, a digital medium environment includes at least one computing device. Systems and techniques are described herein for reassembling and repairing image sections (e.g., torn pieces of an image) by generating masks for the image sections that do not include content of the image sections, and matching image sections along contours (e.g., edges or sides of the image sections) based on shapes of the masks, features of content extracted from the image sections, or combinations thereof, depending on whether an ambiguity is determined. An ambiguity is determined when not all image sections included in the scans are matched by shape, or are redundantly matched. A composite image is reassembled from the image sections based on matching image sections. Furthermore, a composite image is repaired by adding material to the composite image from an additional image (e.g., an image other than the composite image).

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to assemble torn pieces of an image, a method implemented by a computing device, the method comprising:

obtaining, by the computing device, at least one scan including a plurality of image sections;

generating, by the computing device, a respective mask for each image section of the plurality of image sections, the respective mask describing a respective shape of said each image;

determining, by the computing device, first matching image sections of the plurality of image sections based on the respective shape of said each image section described by the respective mask for said each image section;

making, by the computing device, a determination whether said each image section of the plurality of image sections is uniquely matched in the first matching image sections;

responsive to the determination being said each image section is uniquely matched in the first matching image sections, reassembling, by the computing device, the plurality of image sections into a composite image based on the first matching image sections; and responsive to the determination being said each image section is not uniquely matched in the first matching image sections:
  determining, by the computing device, second matching image sections of the plurality of image sections based on respective features of content of image sections that are not uniquely matched; and
  reassembling, by the computing device, the plurality of image sections into the composite image based on the first matching image sections and the second matching image sections.

2. The method as described in claim 1, wherein the generating the respective mask for each image section includes separating the plurality of image sections in a foreground from a background of the at least one scan.

3. The method as described in claim 1, wherein the determining the first matching image sections comprises:
  obtaining, for a respective side of said each image section, a respective moment from the respective mask for said each image section;
  determining a matching score between one image section and an additional image section based on a difference of the respective moment corresponding to the one image section and the respective moment corresponding to the additional image section; and
  determining whether the first matching image sections includes the one image section and the additional image section based on the matching score.

4. The method as described in claim 3, wherein the respective moment is obtained from a product of a signum of a hue moment determined from the respective side and a logarithm of the hue moment.

5. The method as described in claim 1, wherein the respective mask for each image section includes binary indicators for pixels of the at least one scan indicating whether said pixels are included in said each image section.

6. The method as described in claim 1, wherein the respective mask for each image section describes the respective shape of said each image without including content of said each image.

7. The method as described in claim 1, further comprising repairing the composite image by adding material to the composite image.

8. The method as described in claim 7, wherein the material added is obtained from the composite image.

9. The method as described in claim 7, wherein the material added is absent from the composite image and obtained from an image other than the composite image or the plurality of image sections.

10. The method as described in claim 1, wherein the respective features of content of the image sections that are not uniquely matched are extracted from the image sections that are not uniquely matched with a rotationally-invariant feature descriptor.

11. The method as described in claim 1, wherein the making the determination whether said each image section of the plurality of image sections is uniquely matched in the first matching image sections comprises:
  determining whether the first matching image sections include redundant matching images sections; and
  determining whether the plurality of image sections includes an image section not included in the first matching image sections.

12. The method as described in claim 1, wherein the obtaining the at least one scan, the generating the respective mask, the determining the first matching image sections and the second matching image sections, and the reassembling the plurality of image sections into the composite image based on the first matching image sections or based on the first matching image sections and the second matching image sections are performed automatically and without user intervention.

13. In a digital medium environment to assemble image pieces, a system comprising:
  a scan module implemented at least partially in hardware of a computing device to obtain at least one scan including a plurality of image sections;
  a mask generation module implemented at least partially in hardware of the computing device to generate a respective mask describing a respective shape for each image section of the plurality of image sections;
  a shape matching module implemented at least partially in hardware of the computing device to determine first pairs of matching image sections of the plurality of image sections based on the respective shape described by the respective mask for said each image section;
  an ambiguity module implemented at least partially in hardware of the computing device to make a determination of ambiguity, the determination of ambiguity indicating an ambiguity when at least one image section of the plurality of image sections is not included in at least one of the first pairs or when a contour of one image section is matched in multiple pairs of the first pairs, the determination of ambiguity indicating a lack of ambiguity when not indicating the ambiguity;
  a feature matching module implemented at least partially in hardware of the computing device to determine second pairs of matching image sections of the plurality of image sections based on respective features of content extracted from the plurality of image sections;
  a composite image module implemented at least partially in hardware of the computing device to reassemble the plurality of image sections into a composite image based on:
    responsive to the determination indicating the lack of ambiguity, the first pairs of matching image sections; and
    responsive to the determination indicating the ambiguity, the first pairs of matching image sections and the second pairs of matching image sections; and
  a compensation module implemented at least partially in hardware of the computing device to repair the composite image by adding material absent in the composite image to the composite image.

14. The system as described in claim 13, wherein the at least one scan includes multiple scans.

15. The system as described in claim 13, wherein the composite image module is configured to, responsive to the determination indicating the ambiguity, remove at least some pairs of the first pairs of matching image sections based on the second pairs of matching image sections.

16. The system as described in claim 13, wherein the material absent in the composite image and added to the composite image is obtained from a user library image that does not include the plurality of image sections.

17. In a digital medium environment to integrate image pieces, a method implemented by a computing device, the method comprising:
- a step for obtaining at least one scan including a plurality of image sections of multiple images;
- a step for generating a respective mask for each image section of the plurality of image sections, the respective mask describing a respective shape of said each image section;
- a step for determining first pairs of matching image sections of the plurality of image sections based on the respective shape described by the respective mask for said each image section;
- a step for making a determination of ambiguity, the determination of ambiguity indicating an ambiguity when at least one image section of the plurality of image sections is not included in at least one of the first pairs or when one image section is matched for a same contour of the one image section in multiple pairs of the first pairs, the determination of ambiguity indicating a lack of ambiguity when not indicating the ambiguity;
- a step for determining second pairs of matching image sections of the plurality of image sections based on respective features of content extracted from the plurality of image sections;
- responsive to the determination indicating the lack of ambiguity:
  - a step for assigning said each image section to one of a plurality of composite images based on the first pairs of matching image sections, the plurality of composite images representing the multiple images; and
  - a step for reassembling the plurality of image sections into the plurality of composite images based on the first pairs of matching image sections and the assigning; and
- responsive to the determination indicating the ambiguity:
  - a step for designating said each image section to an image of the plurality of composite images based on the first pairs of matching image sections and the second pairs of matching image sections; and
  - a step for reassembling the plurality of image sections into the plurality of composite images based on the first pairs of matching image sections, the second pairs of matching image sections, and the designating.

18. The method as described in claim 17, further comprising repairing the plurality of composite images by adding material to the plurality of composite images, at least some of the material obtained from an additional image other than the multiple images.

19. The method as described in claim 18, wherein the multiple images include images on a film strip and the additional image is on the film strip.

20. The method as described in claim 17, wherein the multiple images include different types of documents, at least one of the documents not including a photograph.

* * * * *